United States Patent [19]
Atsatt et al.

[11] Patent Number: 5,983,309
[45] Date of Patent: Nov. 9, 1999

[54] AUTONOMOUS HIGH SPEED ADDRESS TRANSLATION WITH DEFECT MANAGEMENT FOR HARD DISC DRIVES

[75] Inventors: Sean R. Atsatt; Pervez Edul Virjee; Prafulla Bollampalli Reddy, all of Santa Cruz; Mark Hubert Groo, Boulder Creek; Timothy Verne Gates, Sunnyvale; William Kent Weberg, Los Gatos, all of Calif.; Jimmie Ray Shaver, Yukon, Okla.

[73] Assignee: Seagate Technology, Inc., Scotts Valley, Calif.

[21] Appl. No.: 08/917,005

[22] Filed: Aug. 20, 1997

Related U.S. Application Data

[63] Continuation of application No. 08/485,989, Jun. 7, 1995, abandoned, which is a continuation-in-part of application No. 08/281,445, Jul. 27, 1994, Pat. No. 5,715,818.

[51] Int. Cl.$^6$ .............................. G06F 12/10; G06F 11/00
[52] U.S. Cl. .............................. 711/4; 711/206; 711/219; 711/220; 711/156; 395/182.06
[58] Field of Search ................................ 711/4, 203, 206, 711/156, 219, 220; 395/182.03, 182.06

[56] References Cited

U.S. PATENT DOCUMENTS

| | | |
|---|---|---|
| 4,320,456 | 3/1982 | Heise et al. ............................. 395/823 |
| 4,405,952 | 9/1983 | Slakmon .................................. 360/49 |
| 4,558,446 | 12/1985 | Banba et al. ........................... 371/10.2 |
| 4,656,532 | 4/1987 | Greenberg et al. ....................... 360/48 |
| 4,780,808 | 10/1988 | Moreno et al. ............................ 711/4 |
| 4,792,917 | 12/1988 | Takamatsu et al. .................... 395/841 |
| 4,910,725 | 3/1990 | Drexler et al. ....................... 369/275.1 |
| 4,918,651 | 4/1990 | Bonke et al. ........................... 395/825 |
| 4,986,668 | 1/1991 | Fukushima et al. ..................... 369/59 |
| 5,253,131 | 10/1993 | Chevalier ............................. 360/78.14 |
| 5,255,383 | 10/1993 | Lewis et al. ............................ 711/112 |
| 5,274,509 | 12/1993 | Buch ........................................ 360/48 |
| 5,280,601 | 1/1994 | Desaa et al. ............................... 711/5 |
| 5,343,426 | 8/1994 | Cassidy et al. .................... 365/189.02 |
| 5,347,638 | 9/1994 | Desai et al. ............................. 395/825 |
| 5,369,345 | 11/1994 | Phan et al. .............................. 318/561 |
| 5,455,721 | 10/1995 | Nemazie et al. ........................ 360/51 |
| 5,523,903 | 6/1996 | Hetzler et al. ....................... 360/77.08 |

*Primary Examiner*—Reginald G. Bragdon
*Attorney, Agent, or Firm*—LaRiviere, Grubman & Payne

[57] ABSTRACT

An address translation unit is provided for logical to physical address conversion. In particular, apparatus and method are described for receiving a logical cylinder head sector for a logical block address and converting it into a physical cylinder head sector. If a logical block address is received, it is converted to a physical block address and then the physical block address is converted into a physical cylinder head sector. If a logical cylinder head sector is first received, it is converted into a logical block address, and then the conversion takes place just as it would for an initially received logical block address.

133 Claims, 13 Drawing Sheets

ALU Indirect Data Register

| Bits: | 7 | 6 | 5 | 4 | 3 | 2 | 1 | 0 |
|---|---|---|---|---|---|---|---|---|
| | \multicolumn{8}{c|}{Data Bits (7:0)} |

| Bits: | 7 | 6 | 5 | 4 | 3 | 2 | 1 | 0 |
|---|---|---|---|---|---|---|---|---|
| | | Data Bits (7:0) | | | | | | |

ALU Control Register

| Bits: | 7 | 6 | 5 | 4 | 3 | 2 | 1 | 0 |
|---|---|---|---|---|---|---|---|---|
| | zero | zero | Xfer_MM | Serp_Rec | Rec_ZBS | Rtn_Start | Wait_Host | ALU_Halt |
| | | | 76 | 77 | 78 | 79 | 80 | 81 |

ALU Status Register

| Bits: | 7 | 6 | 5 | 4 | 3 | 2 | 1 | 0 |
|---|---|---|---|---|---|---|---|---|
| | Cmd_When_Busy | LBA_Cmplt | Cmd_Rcvd | ALU_Idle | TLBA_RA | ALU_Par_Err | ALU_Buff_Req | ALU_Done |
| | 83 | 84 | 85 | 86 | 87 | 88 | 89 | 90 |

AUTONOMOUS HIGH SPEED ADDRESS TRANSLATION WITH DEFECT MANAGEMENT FOR HARD DISC DRIVES

CROSS REFERENCE

This application is a continuation of U.S. patent application Ser. No. 08/485,989 filed Jun. 7, 1995 (now abandoned), which is a Continuation-in-Part of U.S. patent application Ser. No. 08/281,445 filed Jul. 27, 1994 (now U.S. Pat. No. 5,715,418).

TECHNICAL FIELD

The invention relates generally to programmable sequencers for performing address translations. In particular, the present invention relates to an address translation logic unit (ALU) for autonomous address translation between logical and physical addresses.

BACKGROUND ART

To communicate between a central processing unit (CPU) and one or more disc drives of a computer system, a disc controller is employed. The disc controller communicates between the CPU and the disc drive.

In order to write information to and retrieve information from disk media of a disc drive, a format is employed. This format facilitates communication between the CPU and the disc drive.

A typical disc drive includes one or more platters (disk media). Either or both surfaces of a platter may be used as is known. For embedded servo systems, each platter's surface is divided into what are euphemistically termed data wedges and servo wedges. From servo wedge to servo wedge defines a data area, and a data area can have a number of data wedges. Each disk also is divided up by concentrically expanding rings known as tracks. If there is more than one platter in a disc drive, tracks in vertical alignment with one another (having the same track number) define a cylinder.

Between servo wedges, tracks contain data fields. Data fields, located in data wedges, are used for writing information to and reading information from disk media. If a data field is defective, it must be identified to prevent using it. A recording zone defines a set of contiguous cylinders used for storing and retrieving information.

Within tracks in the area of servo wedges are servo fields.

The disc controller controls positioning of the read/write head or heads for writing and accessing information on one or more platters. To locate information, a read/write head assembly is passed over the surface of a platter. Information recorded on the platter surface is used for identifying where the head assembly is in relation to a location on the platter. This information is stored in servo fields, and may be stored in headers written at predefined locations on the disk for systems with headers.

Data that a CPU instructs a disc controller to store in a disc drive is first stored in a buffer memory by the disc controller. The controller then reads the buffer memory and writes the data to an address specified by the CPU on disk media. Data which the CPU is to retrieve from the disk media is also retrieved into buffer memory by the disc controller first before being transferred elsewhere in the computer system. Also, information used for address translation is retrieved from reserved tracks on disc media and stored in buffer memory.

To write or retrieve information from a disc drive, a CPU specifies an address on the hard disk. For example, by specifying hard disk cylinder-head-sector (CHS), the CPU provides an address where data is to be found or stored. However, many hard disk media formats are not compatible with some host systems. Consequently, disk drive software often emulates format of the disk media. This emulation is termed logical disc geometry to differentiate it from physical or actual geometry. In this manner, virtual or logical addressing to a disk drive may be employed in order to facilitate compatibility. Some host systems provide only a logical address independent of any geometry; the logical address is called a logical block address (LBA). Consequently, a logical to physical address conversion must take place in order to access or store information on a disk drive.

The more translation required, the more overhead (time or bandwidth) is needed in order to read or write information to a disk drive. The host computer system generally does not have sufficient bandwidth to perform these tasks nor does it generally have sufficient information. Consequently, a local microprocessor is employed on the disc drive. For cost competitive reasons, this local microprocessor is often of limited capability. As such, it may not have sufficient bandwidth to perform address translation at a rate, given other tasks it must perform, which would not be too bandwidth limiting to the disc controller.

Also, different systems will provide different types of addressing. For example, a CPU may supply through a host interface either a logical CHS (LCHS) or a logical block address (LBA). In either case, it is necessary that the disc controller be able to translate the received address into a physical address for accessing the disk drive.

Also, it is likely that there will be defective sectors on a drive. Consequently, the disc controller will need to provide defect management in combination with logical to physical address translation.

The present invention provides method and apparatus for converting a logical address to a physical address with defect management.

SUMMARY OF THE INVENTION

The present invention relates to method and apparatus for converting a logical address to a physical address. In particular, the present invention is directed at receiving either a logical CHS (LCHS) or an LBA and converting it into a physical CHS (PCHS) and physical block address (PBA). A PBA is a linear address independent of drive geometry, but still accounts for defective sectors. The present invention is capable of switching between either one of these logical addresses. If an LCHS is received, it is first converted to an LBA, then the LBA is converted to a PBA. The PBA is then converted to a PCHS for accessing a disk media of a disk drive. In this manner, an address can be provided to a disc controller for either writing or reading information on disk media of a disk drive.

The present invention accommodates a wide variety of interfaces. As is known, interfaces have various performance specification requirements. Throughout the specification, distinctions are made between capabilities of the present invention with respect to a particular interface employed. However, these differences, for the most part, are driven by cost considerations only. Therefore, it should be understood that the present invention can provide all the capabilities listed in the specification either as one complete package, or subparts thereof.

In "headerless" design, headers associated with data fields are omitted. In "header after servo" design, headers are stored on disk media of a disk drive at specified locations only. The present invention is particularly well suited for a "headerless" implementation using header after servo scheme, where the only headers are located immediately after every servo field. Consequently, data fields of which sectors are composed are split around servo fields and headers. This provides a highly efficient embedded servo format having an optimized radial bit-density profile for optimizing disk drive capacity and performance. In headerless design, header information, formerly written on the disk media, resides in buffer memory. In accordance with the present invention, tables are formed for storage of header information in memory maintained by the disc controller. The tables store the header and defect data information required to reconstruct information previously stored on the disk media. This information completely describes layout, addresses, and defect status of all data field fragments within each data wedge for each track on the disk media.

In addition to address translation, the present invention provides mathematical capabilities including addition, subtraction, multiplication, and division. However, for cost consideration reasons, size limits on operands have been imposed. In performing address translation in accordance with the present invention, defect and zone information is provided to an address translation logic unit (ALU). The ALU then performs a set of instructions for converting a logical address to a physical address. In accordance with headerless logic, a defect table resides in memory associated with a disc controller. The ALU performs lookups into the defect table and fetches zone information therefrom. This allows logical to physical address translation to occur autonomously, namely, independent of the microprocessor associated with the disc controller.

In accordance with the present invention, the ALU also has a binary search capability for finding an entry in a defect table whose LBA is the greatest value which is also less than or equivalent to a target LBA (TLBA). Further, in accordance with the present invention, the ALU is able to determine an address of the PZT entry corresponding to the TLBA and fetch zone information required to complete address translation. While the ALU in accordance with the present invention may be used independently of headerless operation, it is directed at headerless layout to improve disk drive controller performance. Moreover, this carries over into improved disk drive performance.

The ALU in accordance with the present invention is a programmable sequencer optimized for performing address translations. The ALU is available to a local microprocessor of a disc controller to accelerate or automate, or a combination of both, address translation tasks. As mentioned elsewhere herein, the ALU is capable of performing: (1) LCHS to LBA conversion wherein the LCHS is provided from a host task file; (2) LBA or LCHS to PCHS conversion with an LBA or LCHS, respectively, provided from a host, with automatic selection between the received LBA or LCHS. As the AI U in accordance with the present invention is programmable, two modes of operation are employed, namely, manual and auto-start modes. In manual mode, the ALU is completely under the control of the local microprocessor. This allows the local microprocessor to use the ALU as a flexible resource for performing translations or subsets of translations independent of a specific host command. In the auto-start mode, the present invention provides address conversion as soon as a new host command is received to the ALU.

The present invention provides: autonomous address translation with defect management without microprocessor intervention; direct connection to a host interface task file data for beginning address translation as soon as the data becomes available from the host; autonomous abort of host commands; autonomous determination of type of logical address received, namely, LCHS or LBA; autonomous detection of reassigned sector and informing the microprocessor of same; support for headerless features by directly providing data for headerless seek and transfer operations to appropriate circuitry; support for zone based sparing and arbitrary size sparing region based sparing; and support for both serpentine and non-serpentine recording schemes.

Other features of the present invention are disclosed or apparent in the section entitled: "BEST MODE FOR CARRYING OUT THE PRESENT INVENTION."

BRIEF DESCRIPTION OF DRAWINGS

For fuller understanding of the present invention, reference is made to the accompanying drawing in the following detailed description of the Best Mode of Carrying Out the Present Invention. In the drawing:

FIG. 9 is a diagrammatic representation of an ALU indirect data register (IDR) in accordance with the present invention.

FIG. 10 is a diagrammatic representation of a control register in accordance with the present invention.

FIG. 11 is a diagrammatic representation of ALU status register in accordance with the present invention.

Figure 1:
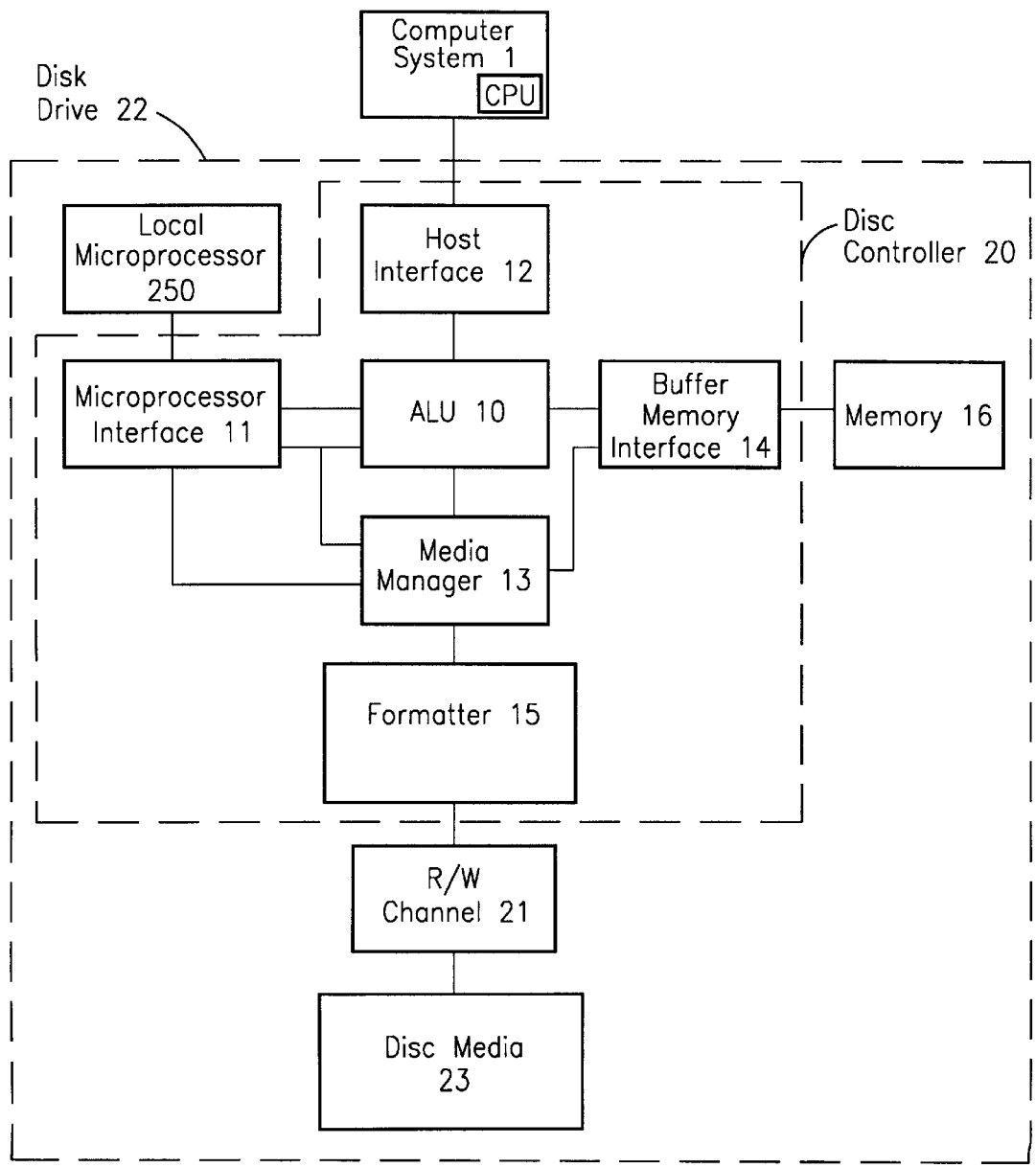
FIG. 1 is a block diagram of address translation logic unit (ALU) as implemented in a disc controller in accordance with the present invention.

Reference numbers refer to the same or equivalent parts of the present invention throughout the several figures of the drawing.

BEST MODE FOR CARRYING OUT THE PRESENT INVENTION

Referring to FIG. 1, there is shown a block diagram of address translation logic unit (ALU) 10 as implemented in disc controller 20 in accordance with the present invention. ALU 10 interfaces with four sections of disc controller 20. They are microprocessor interface 11, host interface 12, media manager 13, and buffer memory interface 14. Microprocessor interface 11 is coupled to local microprocessor 250. It should be understood that disc controller 20 may be made in the form of a single application specific integrated circuit (ASIC), and it will be seen that portions of ALU 10 may be embodied in hardware, firmware, software, or a combination of these.

Disc controller 20 is coupled to computer system 1. Computer system 1 includes a CPU which is to be differentiated from local microprocessor 250.

Media manager 13 interfaces with formatter 15. Formatter 15 is coupled to read/write channel 21. Read/write channel 21 is operative in combination with disk media 23. Buffer memory interface 14 interfaces with memory 16. Memory 16 may be any of a variety of read/write memory elements in accordance with the present invention. In particular, memory 16 may be a dynamic random access memory (DRAM). Host interface 12 may be for any of a variety of bus architectures, including but not limited to an Advanced Technology (AT) bus, an AT Attachment (ATA) interface, a fiber channel interface, a Small Computer System Interface (SCSI), a IEEE P1394 interface, a PCI, and a SCI. Formatter 15, read/write channel 21, disc drive 22, disk media 23, buffer memory interface 14, memory 16, host interface 12, computer system 1, and microprocessor interface 11 are all well-known in the art of the present invention. Moreover, as is known, there are imposed performance requirements for different interfaces. One such requirement is maintaining "synchronous spindles" on an arrayed drive (i.e., "disk mirroring"). Each defect on a disk media causes a slip to be introduced. If there are enough defects to cause spindles to get out of data wedge-wise synchronous rotation with each other, sparing regions must be introduced. By dispersing small sparing regions about each disk media, it allows each spindle to get back into data wedge-wise synchronous rotation at regular intervals. By a "sparing region" it is meant a region of valid data sectors followed by a group of spared sectors.

Other implementations may be used in accordance with the present invention. For example, some such implementations are described in U.S. patent application Ser. No. 08/281,445, entitled "Autonomous High Speed Linear Space Address Mode Translation for Use with a Computer Hard Disc System", filed Jul. 27, 1994, (now U.S. Pat. No. 5,715,418) which is incorporated by reference herein as though fully set forth herein.

Media manager 13 is more fully described in co-pending U.S. patent applications, all of which are incorporated by reference as though fully set forth herein, identified as application Ser. No. 08/479,698 filed Jun. 7, 1995, now abandoned, application Ser. No. 08/869,041 filed Jun. 4, 1997 presently pending, which is a continuation of application Ser. No. 08/476,265, now abandoned, and application Ser. No. 08/857,535 presently pending, which is a continuation of application Ser. No. 08/476,264, now abandoned.

Host interface 12 provides a logical address to ALU 10 from an external CPU. The type of address provided depends on the host interface. The address will either be a logical cylinder-head-sector (LCHS) or a logical block address (LBA). To address disk media 23, the address provided by host interface 12 will have to be converted into a physical cylinder-head-sector (PCHS). If a LCHS is received to ALU 10, it is translated into a LBA, then to a physical block address (PBA), and then to a PCHS. If an LBA is received to ALU 10, it is translated to a PBA and then to PCHS.

Prior to discussing the operation of the present invention, a detailed description of the terms used herein is provided.

ALU to Microprocessor Interface

Figure 2:
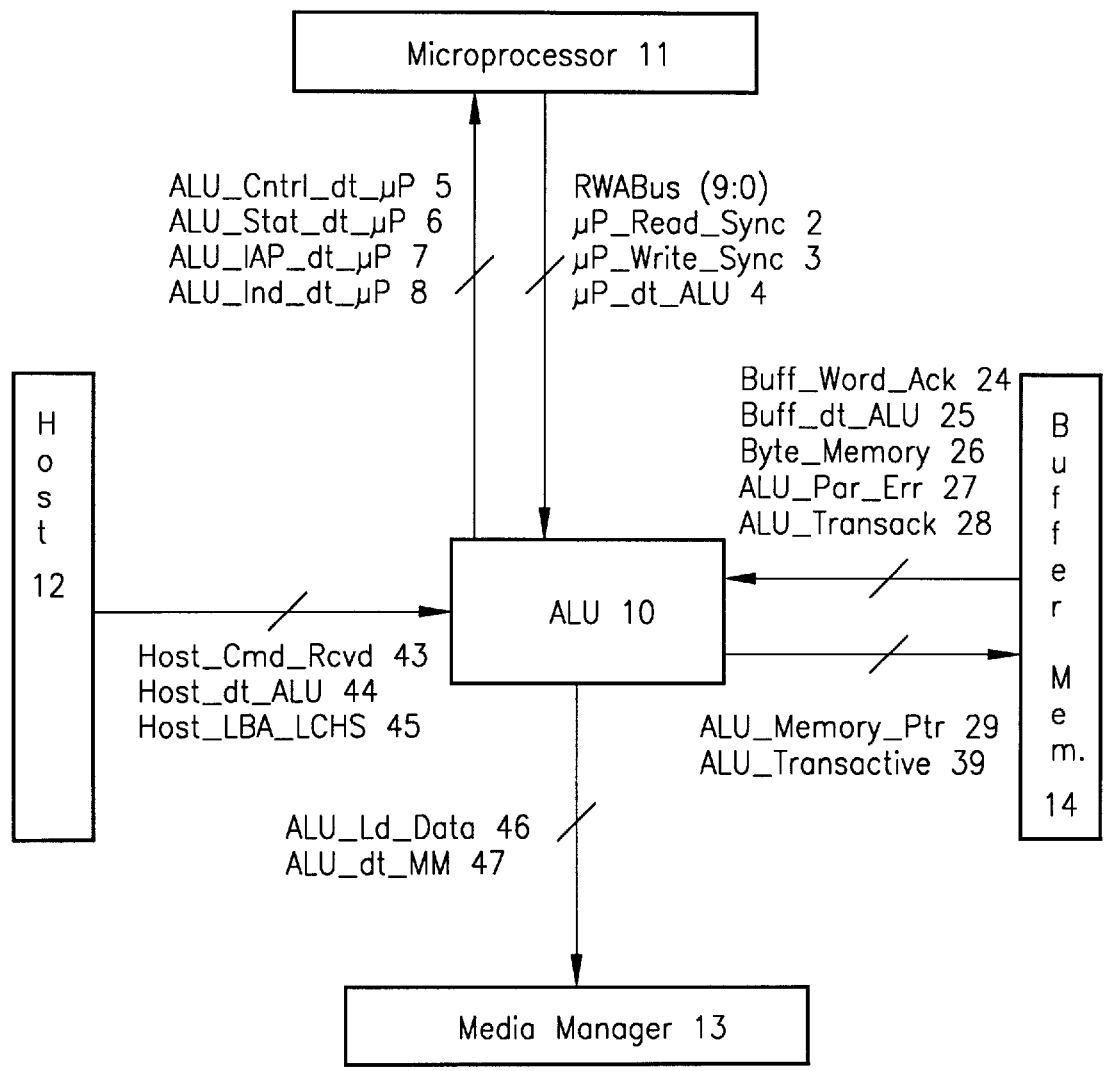
FIG. 2 is a block diagram of an interface of an ALU in accordance with the present invention.

Referring now to FIG. 2, there is shown a block diagram of an interface of ALU 10 in accordance with the present invention.

ALU 10 is coupled to microprocessor interface 11. Microprocessor interface 11 provides reading and writing to all registers of ALU 10, and interfaces with ALU 10 through four address locations, which represent a control register, a status register, an indirect address pointer, and indirect data register. The control register configures operational modes of ALU 10. The status register provides ALU 10 status, and is the primary handshake between microprocessor interface 11 and ALU 10. The indirect address pointer is an auto-incrementing address pointer for pointing to all ALU 10 indirect registers, excluding the indirect address pointer itself. The indirect data register is used to read or write to a register pointed to by the indirect address pointer. These registers are discussed in more detail elsewhere herein.

Several signals are used to communicate between ALU 10 and microprocessor interface 11. They are $\mu P\_Read\_Sync$ 2, $\mu P\_Write\_Sync$ 3, $ALU\_Cntrl\_dt\_\mu P$ 5, $ALU\_Stat\_dt\_\mu P$ 6, $ALU\_IAP\_dt\_\mu P$ 7, $ALU\_Ind\_dt\_\mu P$ 8, $\mu P\_dt\_ALU$ 4, and RWABus 9. Microprocessor read synchronized ($\mu P\_Read\_Sync$) signal 2 is true when microprocessor interface 11 is reading a register of ALU 10, and microprocessor write synchronized ($\mu P\_Write\_Sync$) signal 3 is true when microprocessor interface 11 is writing to a register of ALU 10. $ALU\_Cntrl\_dt\_\mu P$ (ALU control data to microprocessor) 5 is a signal for providing configuration register data of ALU 10 to microprocessor interface 11. $ALU\_Stat\_dt\_\mu P$ (ALU status data to microprocessor) 6 is a signal for providing status register data of ALU 10 to microprocessor interface 11. $ALU\_{IAP}\_dt\_\mu P$ (ALU indirect address pointer data to microprocessor) 7 is a signal for providing indirect address pointer register data of ALU 10 to microprocessor interface 11. $ALU\_Ind\_dt\_\mu P$ (ALU indirect data to microprocessor) 8 is a signal for providing indirect data (pointed to by the indirect address pointer) of ALU 10 to microprocessor interface 11. Signal $\mu P\_dt\_ALU$ (microprocessor data to ALU) 4 provides microprocessor interface 11 data to write to ALU 10. Lastly, RWABus (read/write address bus) 9 is the demultiplexed address of local microprocessor 250. This signal is used by microprocessor interface 11 for addressing registers of ALU 10. As indicated, RWABus is a ten bit long signal, for the embodiment discussed herein.

ALU to Buffer Memory Interface

ALU 10 is interfaced to buffer memory interface 14 to perform the required binary search of the defect description table (DDT) and to fetch from memory 16 the required entry in the physical zone table (PZT). The binary search is to find the DDT entry whose LBA is the greatest value less than or equal to a target LBA (TLBA). The DDT entry found will also include the correct slip value for the LBA to PBA address translation.

Buffer memory interface 14 passes each data word to ALU 10 as it is fetched from memory 16. To support both eight-bit and sixteen-bit interfaces to memory 16, buffer memory interface 14 provides data from memory 16 to ALU 10 in sixteen-bit words, performing two reads for each word in eight-bit mode for the embodiment described herein. However, other word lengths may be used in accordance with the present invention.

If ALU 10 requests a paragraph read from memory 16, buffer memory interface 14 arbitrates for access and strobes each data word into ALU 10. ALU 10, operating as a sequencer, uses or stores the retrieved data as appropriate. ALU 10 uses only the correct words out of each paragraph fetched.

ALU 10 interface to buffer memory employs several signals. They are: ALU_Transactive 39, ALU_memory_Ptr 29, ALU_Transack 28, Buff_Word_Ack 24, Buff_dt_ALU 25, Byte_memory 26, and ALU_Par_Err 27. ALU_Transactive 39 is true when ALU 10 is requesting buffer memory interface 14 to fetch a paragraph (16 bytes or words for this implementation) of data from memory 16. ALU_Memory_Ptr (ALU memory pointer) 29 is the address pointer to the requested paragraph in memory 16. ALU_Transack (ALU transaction) 28 is active when ALU 10 has won arbitration and a memory 16 fetch is occurring. Buff_Word_Ack (buffer word acknowledge) 24 is a strobe signal from buffer memory interface 14 to ALU 10 to strobe each word into ALU 10. Buff_dt_ALU 25 is a word fetch (sixteen-bit) from memory 16. Buff_dt_ALU (buffer data to ALU) 25 is true when both Buff_Word_Ack 24 and ALU_Transack 28 are active. Byte_memory 26 is a configuration bit signal. When Byte_memory 26 is high, data from memory 16 is eight-bits wide; when_Byte memory 26 is low, data from memory 16 is sixteen-bits wide. ALU_Par_Err (ALU parity error) 27 is a pulse to ALU 10 to indicate that a buffer memory interface 14 fetch had a parity error. In which case, the status is latched in ALU 10, and may only be cleared by microprocessor interface 11.

Table Descriptions

With reference to FIGS. 1 and 2 in combination, two tables are stored in memory 16 for access by ALU 10. The defect description table (DDT) is also employed for supporting a headerless format. However, it should be understood that the present invention may be used with disc drive 22, when disc drive 22 has either a headerless or a non-headerless format on disk media 23.

a. Defect Description Table

Figure 3:
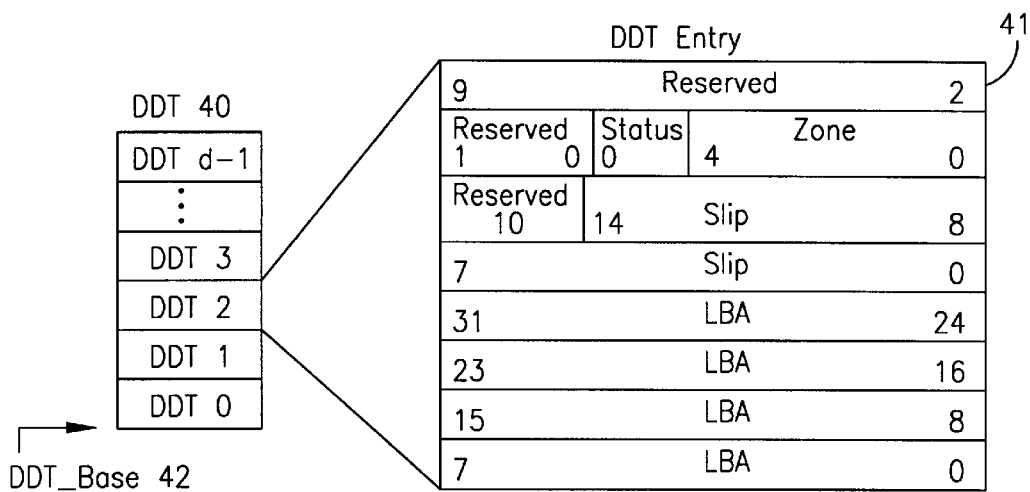
FIG. 3 is a diagrammatic representation of defect description table (DDT) and a sample DDT entry in accordance with the present invention.
Figure 4:
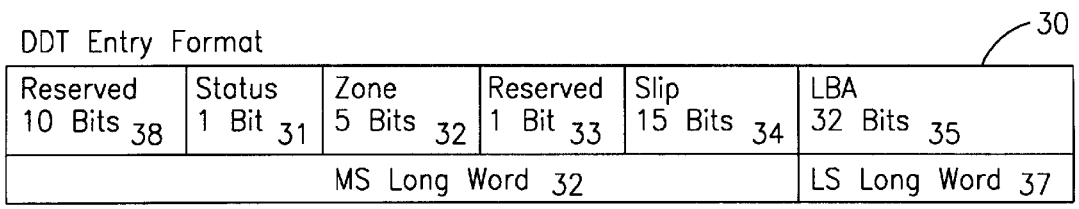
FIG. 4 is a diagrammatic representation of a DDT entry format in accordance with the present invention.

Referring to FIG. 3, there is shown a representation of defect description table (DDT) 40 and a sample DDT entry 41 in accordance with the present invention. In FIG. 4, there is shown a representation of a DDT entry format 30 which may be used in accordance with the present invention. The first 32 bits of DDT entry format 30 form the MS long word 36, and the last 32 bits of DDT entry format 30 form the LS long word 37.

Referring to FIGS. 3 and 4 in combination, DDT 40 enables controller 20 (shown in FIG. 1) to calculate the PBA and PCHS for a given LBA, to detect and skip defective sectors during data transfer, to detect the last user PBA in a recording zone, and to detect reassigned sectors. DDT 40 contains information to allow controller 20 (shown in FIG. 1) to convert each LBA to a PCHS and to navigate defects while transferring data. DDT 40 replaces the defect table previously kept by microprocessor interface 11 in code random access memory (RAM).

Reserved bits fields 38, 33 may be used by firmware. For example, they may be used for an index for alternate PBA entries. As shown, ten bits and one bit are reserved for reserved bits fields 38 and 33, respectively, in this DDT entry format 30.

Status bit field 31 indicates the status for its associated entry. When status bit 31 is low, status for the associated DDT 40 entry is good (i.e., the sector associated with the DDT 40 entry is not defective). When status bit 31 is high, status for the associated DDT 40 entry is a reassigned LBA.

Entries for defective sectors are not stored in DDT 40. However, there is a DDT 40 entry for each good or reassigned sector immediately following a defective sector or group of consecutive defective sectors. This allows for only one entry for a set of consecutive defects, rather than one per defect. There is also a DDT 40 entry for the first sector of zone field 32 with good or reassigned status. As shown, one bit is reserved in this DDT entry format 30.

A zone refers to one or more cylinders on disk media 23 used for recording information. Zone 32 is the physical recording area on disk media 23 (shown in FIG. 1) having an LBA associated with an entry of DDT 40. As shown, five bits are reserved in this DDT entry format 30.

Slip field 34 is for the number of sectors that have been mapped out on disk media 23 (shown in FIG. 1) before a predetermined LBA from the start of drive 22 (shown in FIG. 1). These sectors are not available to the user, but are reserved for replacing defective sectors or are themselves defective. In other words, if there is a defective sector on one disk and not on another, there must be sufficient slippage to accommodate logical to physical address shifting. As shown, fifteen bits are reserved in this DDT entry format 30.

As mentioned elsewhere herein, LBA field 35 is for a unique logical address of a host interface 12 (shown in FIG. 1) user sector on drive 22 (shown in FIG. 1). There are three types of DDT 40 entries, and each has an LBA value. The three types of DDT 40 entries are defective sector, zone boundary, and reassigned sector.

A DDT 40 entry for defective sectors is associated with the next good or reassigned sector of a corresponding zone 32. DDT 40 entries associated with defective sectors have an LBA value equal to an LBA value of the next good or reassigned sector following a defective sector or group of consecutive defective sectors.

A DDT 40 entry for identifying a zone boundary is associated with the first good or reassigned sector of a corresponding zone 32. These DDT 40 entries have an LBA value equal to the first good or reassigned sector of an associated zone 32.

A DDT 40 entry for a reassigned sector is associated with that reassigned sector. Each DDT 40 entry associated with a reassigned sector has an LBA value equal to an LBA value of the reassigned sector.

In FIG. 3, DDT entry 41 illustratively shows a sample entry in accordance with DDT entry format 30.

With renewed reference to FIG. 3, DDT 40 has entries DDT 0 through d-1, inclusive, where d is a positive integer greater than one. The first location in DDT 40 is DDT 0, namely, DDT base (DDT_Base) 42 address. Using a binary search algorithm, DDT 40 is searched to find an entry whose LBA is the greatest value less than or equal to a TLBA.

b. Physical Zone Table (PZT)

Figures 5, 6, 7:
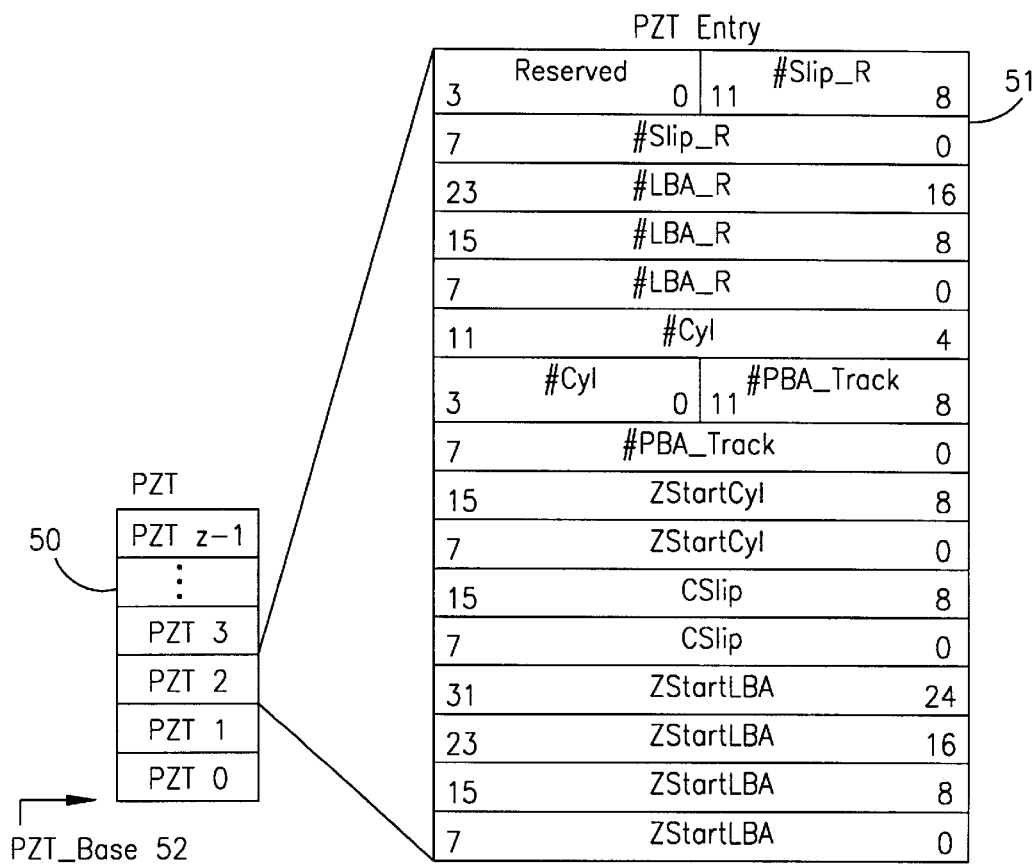
FIG. 5 is a diagrammatic representation of a physical zone table (PZT) and a sample PZT entry in accordance with the present invention.
FIG. 6 is a diagram illustrating a PZT entry format in accordance with the present invention.
FIG. 7 is a diagrammatic representation of indirect address pointer (IAP) register in accordance with the present invention.

Referring to FIG. 5, there is shown a representation of a PZT 50 and a sample PZT entry 51 in accordance with the present invention. PZT 50: contains information describing each recording zone on disk media 23 (shown in FIG. 1); provides data required by controller 20 (shown in FIG. 1) to convert each LBA to its associated PCHS; and provides information for determining logical and physical end of track addresses. Referring to FIG. 6, there is shown a diagram illustrating a PZT entry format 60 which may be used in accordance with the present invention. Referring to FIGS. 5 and 6 in combination, PZT 50 stores data used by controller 20 (shown in FIG. 1) to support LBA to PCHS translations and to determine the end of a track during a data transfer. In PZT 50, there are 0 through z-1, inclusive, entries, where z is a positive integer greater than or equal to one. PZT 50 has one entry for each physical recording zone 32 on disk media 23 (shown in FIG. 1). The size of each PZT 50 entry is programmable from 0 to 256 bytes. In accordance with the implementation described herein, each PZT 50 entry should be a multiple of sixteen bytes. PZT entry format 60 is for a 16-byte PZT 50 entry. Sample PZT entry 51 has a 16-byte size and is in format 60.

PZT entry format 60 has numbers of bits allocated for each field. Reserved 61 is available for firmware. For example, reserved 61 may be used to store additional information with respect to zone 32 (referenced in FIG. 4). As shown, four bits are reserved in this PZT entry format 60.

The number of slipped sectors per sparing region is located in #Slip_R 62. As shown, twelve bits are reserved in this PZT entry format 60.

The number of LBAs per sparing region is located in #LBA_R 63. As shown, twenty-four bits are reserved in this PZT entry format 60.

The number of cylinders in a zone 32 (referenced in FIG. 4) is located in #Cyl 64. As shown, twelve bits are reserved in this PZT entry format 60.

The number of PBA's per track for a zone 32 (reference in FIG. 4) is located in #PBA_Track 65. As shown, twelve bits are reserved in this PZT entry format 60.

ZStartCyl 66 is the starting physical cylinder of a zone. As shown, sixteen bits are reserved in this PZT entry format 60.

CSlip 67 is the cumulative slip 34 (referenced in FIG. 4) from the beginning of drive media 23 (shown in FIG. 1) to the start of a zone 32 (referenced in FIG. 4). As shown, sixteen bits are reserved in this PZT entry format 60.

ZStartLBA is the LBA of the starting sector in a zone 32 (reference in FIG. 4). As shown, thirty-two bits are reserved in this PZT entry format 60.

ALU to Host Interface

With renewed reference to FIG. 2, ALU 10 interfaces to host interface 12 of controller 20 to directly obtain either a TLBA or a target LCHS (TLCHS). As discussed elsewhere herein, these target addresses are converted to physical addresses. ALU 10 will fetch a target address based on the state of its current command word. Host_Cmd_Rcvd (host command received) (Cmd_Rcvd) signal 43 is a pulse from host interface 12. Cmd_Rcvd 43 is asserted on each command received to controller 20. Host_dt_ALU (host data to ALU) 44 is data from host interface 12 to ALU 10. This data is a logical address, namely, an LBA if host interface 12 is an interface to a SCSI for example. If host interface 12 is an interface to an AT bus, then Host_dt_ALU 44 may be an LCHS for example. This data is taken from host interface 12 task file shadow registers rather than from an actual task file. Host_LBA_LCHS 45 is true when Host_dt_ALU 94 represents an LBA. Host_LBA_LCHS 45 is false when Host_dt_ALU 44 represents an LCHS. This true/false indication is used for automatically switching between received TLBA's and TLCHS's. The Host_LBA_LCHS 45 signal represents bit six of the drive/head shadow register in accordance with the embodiment described herein.

ALU to Media Manager Interface

With continued reference to FIG. 2, ALU 10 interfaces to media manager 13 to directly load the translated address (logical to physical address) into media manager 13. In other words, ALU 10 provides translation of a received TLBA or TLCHS to a PCHS, which is in turn provided to media manager 13. ALU 10 provides this load to media manager 13 based on microprocessor interface 11 setting a command bit. The embodiment described herein supports LBA to PBA and then to PCHS translation using a combination of recording zone base sparing or non-recording zone based sparing, and serpentine or non-serpentine seeking.

ALU 10 interface to media manager 13 includes two signals, namely, ALU_Ld_Data (ALU load data) 46 and ALU_dt_MM (ALU data to memory manager) 47. ALU_Ld_Data 46 is a pulse provided by ALU 10 to media manager 13 for loading the translated address into appropriate registers in media manager 13. ALU_dt_MM 47 provides address translation results of ALU 10 to media manager 13 along with some additional information.

Bits 0 through 15, inclusive, of ALU_dt_MM 47 are for a target slip. In other words, the slip of the TLBA. The target slip is denoted as Tslip (15:0).

Bits 16 through 19, inclusive, of ALU_dt_MM 47 are for a byte (word) offset of the LBA field. This LBA field, as discussed elsewhere herein, is the one found within the paragraph of data having the greatest LBA found in DDT 40 (shown in FIG. 3) which is less than or equal to the TLBA. The byte or word offset of the LBA field is denoted as &DDT[gle].LBA (3:0).

Bits 20 through 35, inclusive, of ALU_dt_MM 47 are for a buffer address of the paragraph of data containing the greatest LBA found in DDT 40 (shown in FIG. 3) which is less than or equal to the TLBA. The buffer address of this paragraph is denoted as &DDT[gle] (15:0).

Bits 36 through 67, inclusive, of ALU_dt_MM 47 are for the target PBA to be transferred. The target PBA is denoted as TPBA (31:0).

Bits 68 through 99, inclusive, of ALU_dt_MM 47 are for the current track's starting PBA. The starting PBA of the current track is denoted as TrkStartPBA (31:0).

Bits 100 through 131, inclusive, of ALU_dt_MM 47 are for the next track's starting PBA. The starting PBA of the next track is denoted as NextTrkStartPBA (31:0).

Where host interface 12 (shown in FIG. 1) is to a SCSI, additional information is provided from ALU 10 to media manager 13. Bits 132 through 163, inclusive, of ALU_dt_MM 47 are for the next sparing region's starting LBA, which is denoted as NextRStartLBA (31:0), and bits 164 through 195, inclusive, of ALU_dt_MM 47 are for the TLBA to be transferred, which is denoted as TLBA (31:0).

ALU Registers

As mentioned elsewhere herein, ALU 10 includes four address locations which represent a control register, a status register, an indirect address pointer, and an indirect data register.

a. ALU Indirect Address Pointer

Referring to FIG. 7, there is shown a representation of indirect address pointer (IAP) register 70 in accordance with the present invention. As shown, IAP register 70 is 8 bits wide (0:7), bits 0 through 6, inclusive, comprise 6 IAP pointers, namely, IAP 0 through IAP 6, inclusive. Bit 7 is set to zero.

ALU 10 (shown in FIG. 1) includes IAP register 70 at a specified address, which in the embodiment described herein is (3:20h).

IAP register 70 may be loaded or read directly by microprocessor interface 11. To read/write to a register of ALU 10, a starting address of the first register is loaded into IAP register 70. IAP register 70 then increments itself after each write or read to sequentially load the remaining registers of ALU 10. IAP register 70 rolls over to zero after a maximum address is reached. Disc reset clears IAP register 70 and all of the registers that are pointed to by IAP register 70. IAP register 70 is a read/write element.

IAP register 70 allows access to registers of ALU 10 (shown in FIG. 1). Table I lists registers for which IAP register 70 allows access. In Table I, the first column indicates the name of the register and the second column indicates the indirect address of the corresponding register which may be pointed to by IAP register 70.

TABLE I

| Register Name | Indirect Addr Ptr | Value Base | Num Bits |
|---|---|---|---|
| Control_Square | 00h–1Fh | 0 | |
| Q_reg | 20h–23h | 0 | 32 |
| M_reg | 24h–25h | 0 | 16 |
| A_reg | 26h–27h | 0 | 16 |
| Reg 1 | 28h | 0 | 8 |
| Reg 2 | 29h | 0 | 8 |
| Reg 3 | 2Ah | 0 | 8 |
| Reg 4 | 2Bh | 1 | 8 |
| Reg 5–6 | 2Ch–2Dh | 0 | 16 |
| Reg 7 (bits 4-0) | 2Eh | 0 | 4 |
| Reg 7 (bit 5) | 2Eh | 0 | 1 |
| Reg 8–9 | 2Fh–30h | 0 | 16 |
| Reg 10–13 | 31h–34h | 0 | 32 |
| Reg 14–17 | 35h–38h | 0 | 32 |
| Reg 18–19 | 39h–3Ah | 0 | 16 |
| Reg 20–23 | 3Bh–3Eh | 0 | 32 |
| DDT_Virtual_Size | 3Fh–40h | 0 | 16 |
| DDT_Base | 41h–42h | 0 | 16 |
| PZT_Base | 43h–44h | 0 | 16 |
| PZT_Entry_Size | 45h | 0 | 8 |
| PC_End_Addr (4-0) | 46h | 0 | 8 |
| Instruction_Ptr | 47h | 0 | 8 |
| PC_Start_Addr (4-0) | 48h | 0 | 8 |
| DDT_Up_Limit | 49h–4Ah | 0 | 16 |
| ALU_DBlkPtr | 4Bh–4Dh | 0 | 24 |

Figure 8:
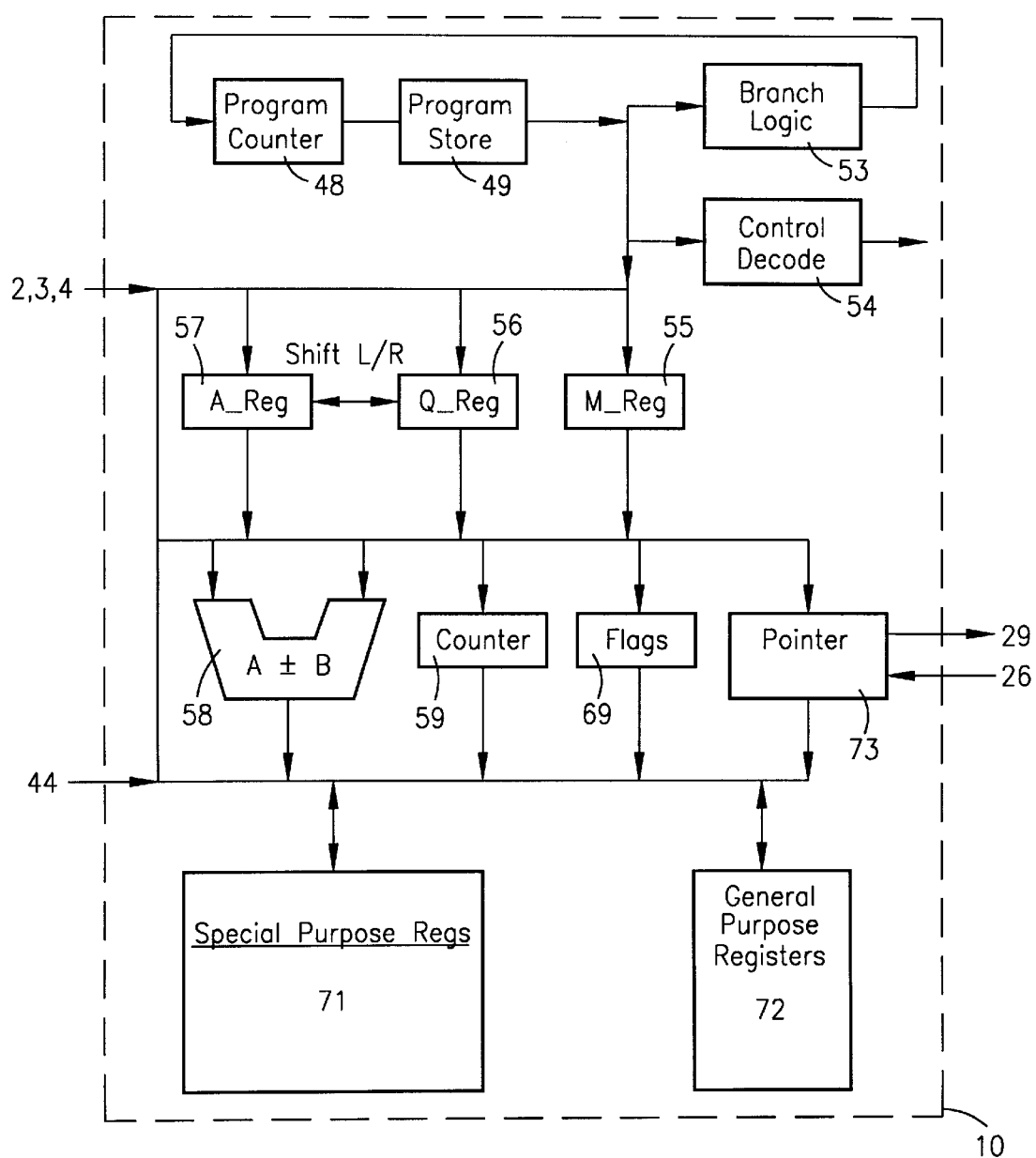
FIG. 8 is a block diagram of an ALU in accordance with the present invention.

Referring now to FIG. 8, there is shown a block diagram of ALU 10 in accordance with the present invention. ALU 10 comprises program counter 48, program store 49, branch logic 53, control decode 54, register A (A_Reg) 57, register Q (Q_Reg) 56, register M (M_Reg) 55, arithmetic-logic unit 58, counter 59, flags 69, (memory 16) pointer 73, special purpose registers 71, and general purpose registers 72. It should be understood that ALU 10 shown in FIG. 8 is merely one possible configuration. As ALU 10 was designed using known VHDL [VHSIC (Very High Speed Integrated Circuit) Hardware Description Language] circuit synthesis, so only intended behavior need be specified. The VHDL synthesis provides gates for implementation. Thus, ALU 10 may comprise one arithmetic logic unit 58 or more than one. In other words, each block in FIG. 8 merely represents functional capability, and is not intended to limit ALU 10 to a specific circuit.

Special purpose registers 71 hold DDT Base 42 address, DDT_Virtual_Size (number of entries in DDT 40), DDT_Up_Limit (upper limit address of DDT 40), PZT_Base 52 address, PZT_Entry Size (size of an entry in PZT 50), and #Heads (number of heads). In the embodiment described herein, 21 bytes are reserved for general purpose register 72, and arithmetic-logic unit 58 is for processing 32 bits at a time.

Program store 49 stores instruction locations for individual control. Q_Reg 56 is for temporary storage of results, and is used in multiplies and divides arithmetic operations. Q_Reg 56 is employed for storing a calculated track starting PBA (TrkStartPBA). M_Reg 55 stores an operand source, and is also used in multiplies and divides operations. A_Reg 57 is for temporary storage of results and is also used in multiplies and divides arithmetic operations. As pointed out hereinabove, Table I lists ALU registers for which IAP register 70 allows access. Registers 1 and 2 are resident in block 71, Special Purpose Registers, shown in FIG. 8. Registers 3–23 are resident in block 72, General Purpose Registers, also shown in FIG. 8.

Reg (register) 1 is for storing logical head/drive information (notably, more than one drive 22 may be employed in accordance with the present invention). Reg 1 is not modified by ALU 10. Reg 2 is for storing logical sector/track information used in LCHS to LBA conversion. Reg 2 is also not modified by ALU 10.

Reg 3 through Reg 23, inclusive, are for general purpose storage and are updated during ALU 10 execution.

Reg 3 is for storing a logical head number. Reg 4 is for storing a logical sector number. Reg 3 and Reg 4, along with Q_Reg (block 56 in FIG. 8) which stores the cylinder number, are loaded by the task register for LCHS to LBA conversion.

The physical location of values calculated as described elsewhere herein in accordance with the present invention are stored at the following locations:

a. Reg 3 and Reg 4 store a TPHead_C (Target Physical Head within a cylinder).

b. Reg 5 and Reg 6 are for storing a TPBA track number.

c. Reg 7 (bits 4-0) is for storing DDT[gle].Zone. DDT [gle].Zone is a zone value found in a DDT 40 entry having the LBA which is the greatest LBA in DDT 40 which is also less than or equal to ("gle"—greatest which is less than or equal to) the TLBA.

d. Reg 7 (bit 5) is for storing DDT[gle].Status, namely the status value found from a binary search of DDT 40 to find the aforementioned LBA.

e. Reg 8 and Reg 9 are for storing a target physical cylinder number (TPCyl).

f. Reg 10 through 13, inclusive, are for storing a calculated next track starting PBA (NextTrkStartPBA).

g. Reg 14 through 17, inclusive, are for storing a calculated target PBA (TPBA).

h. Reg 18 and 19 are for storing a slip value (DDT[gle].Slip) found in a DDT 40 entry having the greatest LBA in DDT 40 which is equal to or less than the TLBA.

i. Reg 20 through 23, inclusive, are for storing the TLBA.

DDT_Virtual_Size is the size of DDT 40, rounded up to the nearest power of 2. DDT_Base 42 is the base address of DDT 40 in memory 16. In accordance with the embodiment described herein, multiplies of 16 bytes or words are employed depending on the width of memory 16.

PZT_Base 52 is the base address of PZT 50 in memory 16. It is also stored in multiples of 16 bytes or words again depending on width of memory 16.

PZT_Entry_Size is the size of each PZT 50 entry in bytes. In accordance with the embodiment described herein, the range of the size of each PZT entry is from 0 to 256 bytes. PC_End_Addr (4-0) instructs ALU 10 to halt after execution of this instruction. Instruction_Ptr (instruction pointer) is the value of the current instruction pointer into Control_Store. PC_Start_Addr (4-0) is an address of the starting instruction to be executed. DDT_Up_Limit is the upper limit address of DDT 40. ALU_DBlkPtr is a pointer to memory 16 for buffer access. This is a read only pointer.

b. ALU Indirect Data Register

In FIG. 9, there is shown a representation of ALU indirect data register (IDR) 74 in accordance with the present invention. IDR 74 has an address which can be loaded or read directly by microprocessor interface 11. IDR 74 contains data to be loaded into or read from a location specified by IAP register 70. It should be understood that IDR register 74 is not an actual register but a port to a register specified by IAP register 70. IDR 74 is a read/write element. In the embodiment described herein, IDR 74 has an address of (3:21h).

C. ALU Control Register

ALU control register configures and controls operation of ALU 10. In the embodiment described herein, its address is (3:22h), and the reset state of ALU control register is 011101.

Referring to FIG. 10, there is shown a representation of a control register 75 in accordance with the present invention. For the embodiment described herein, it is 8 bits wide as is IDR 74. Bits 6 and 7 are for zero values. Xfer_MM 76, Serp_Rec 77, Rec_ZBS 78, Rtn_Start 79, Wait_Host 80, and ALU_Halt 81 are all bits which may be read or written. Xfer_MM 76 is set when ALU 10 transfers data (ALU_dt_MM 47 is active) to media manager 13 after waiting for ALU_Done 90 (see FIG. 12) to be true. This byte self-clears when the transfer is completed.

Serp_Rec 77 when set, configures ALU 10 for serpentine recording (seeking) scheme. A serpentine recording scheme transfers all data on a given surface, within a recording zone, before switching heads. When a head switch is made, a cylinder number is not changed, and the subsequent surface is transferred in reverse track order from a previous surface. In other words, an active head moves across a platter, then a head directly above or below on an adjacent platter becomes the active head and moves across its platter. Looking at a disk drive from an exposed side it would appear that the active head sequence zigzags up or down the disk stack. Thus, the "S" or serpentine nature of the transfer.

Rec_ZBS 78, when set, configures ALU 10 sequencer for a recording zone based sparing scheme. DDT 40 must still contain an entry for the first LBA of each recording zone 32. When Rec_ZBS 78 bit is cleared, ALU 10 sequencer is configured for multiple sparing regions per recording zone. In which case, ALU 10 calculates the boundaries of sparing regions and provides NextRStartLBA (included in ALU_dt_MM 47) to media manager 13.

Rtn_Start 79, when set, automatically reloads ALU 10 instruction pointer with the value in Starting Address register when an ending instruction is executed. When this bit is cleared, ALU 10 instruction pointer remains at the ending instruction, and then ALU 10 instruction pointer moves one location passed the ending instruction after the ending instruction is executed. This allows single step execution and consequently easier debugging.

Wait_Host 80, when set, causes ALU 10 to exit an idle state if Cmd_Rcvd 85 bit is true. This is true independent of ALU_Done 90. ALU 10 automatically clears ALU_Done 90 if it is set, and begins executing. This allows ALU 10 sequencer to execute on successive host commands (Host_Cmd_Rcvd 43) without microprocessor interface 11 intervention. If a subsequent host command is received before a current command finishes executing, ALU 10 aborts the current translation and begins executing on the latest command. When Wait_Host 80 bit is cleared, ALU 10 exits the idle state only after ALU_Done 90 bit is cleared by microprocessor interface 11 and executes independently of receipt of host interface 12 commands.

ALU_Halt 81, when set, aborts any ALU 10 operation and forces ALU 10 into the idle state. When set this bit also clears Cmd_Rcvd 85 and ALU_Buff_Req 89, and sets ALU_Done 90. ALU_Done 90 can only be cleared after ALU_Halt 81 has been cleared.

d. ALU Status Register

Referring to FIG. 11, there is shown a representation of ALU 10 status register 82 in accordance with the present invention. ALU 10 status register 82 provides status to microprocessor interface 11. In the embodiment described herein, ALU 10 status register has an address of (3:23h) and the reset state of this register is 00010001. Again, this register is 8 bits wide. All bits in register 82 are readable; however, only Cmd_When_Busy 83, Cmd_Rcvd 85, TLBA_RA 87, ALU_Par_Err 88, and ALU_Done 90 may be cleared.

Cmd_When_Busy 83 is set when a host command is received (Host_Cmd_Rcvd 43 is active) and ALU 10 is not in an idle state. This bit is cleared by a microprocessor interface 11 write of 1 bit to this bit.

LBA_Cmplt 84 is set by ALU 10 when it is completed calculating an LBA for a current translation. This bit is cleared when ALU 10 exits the idle state.

Cmd_Rcvd 85 is set when a host command (Host_Cmd_Rcvd 43) is received by ALU 10. This bit is cleared when ALU 10 sequencer exits the idle state. This bit is also held clear when ALU_Halt 81 or ALU_Par_Err 88 are set.

ALU_Idle 86, when set, indicates that ALU 10 is in its idle state. ALU 10 enters an idle state as a result of any one of four conditions:
1. ALU_Halt 81 is set;
2. ALU_Par_Err 88 is true;
3. The last instruction is executed; or
4. Momentarily, if Wait_Host 80 is true and ALU 10 restarts executing on receiving a subsequent host command while processing a current host command. If this occurs, ALU_Done 90 bit is not set until subsequent host command has been translated and Cmd_When_Busy 83 bit is set.

As stated hereinabove in connection with FIGS. 3 and 4, DDT 40 is searched to find an entry whose LBA is the greatest value less than or equal to a TLBA. With reference to FIG. 11, TLBA_RA 87 is set when such an entry is found, and that entry is reassigned. This bit is cleared when ALU 10 exits the idle state.

ALU_Par_Err 88 provides status to microprocessor interface 11 that an ALU 10 fetch had a parity error. This bit is set by buffer memory interface 14 logic upon completion of the fetch, and cleared by microprocessor interface 11. ALU_Par_Err 88 bit is cleared with a selective write to it. When set, this bit also clears Cmd_Rcvd 85 and ALU_Buff_Req 89 and sets ALU_Done 90. ALU_Done 90 can only be cleared after ALU_Par_Err 88 has been cleared.

ALU_Buff_Req 89 is set by ALU 10 to indicate that ALU 10 is requesting a paragraph fetch (in the embodiment described herein, 16 or 32 bytes) from memory 16. Since ALU 10 never writes to memory 16, direction is implied to be read only. ALU_Buff_Req 89 bit is cleared by ALU 10 once a memory 16 fetch has been acknowledged or an abort has occurred while requesting a paragraph fetch. ALU_Par_Err 88 and ALU_Halt 81 set out the abort conditions.

ALU_Done 90 and Wait_host 80 bits set out the ways in which ALU 10 can exit the idle state.

ALU Done 90 is set by ALU 10 when either the instruction specified by an ending instruction register is executed or ALU 10 is forced to an idle state by an ALU_Par_Err 88 or ALU_Halt 81. ALU_Done 90 may be cleared by either the hardware or microprocessor interface 11. The hardware clears ALU Done 90 and exits idle if Wait_host 80 is true and a subsequent host command (Host_Cmd_Rcvd 43) is received. This enables ALU 10 to execute successive host commands without microprocessor interface 11 intervention. Microprocessor interface 11 can clear ALU_Done 90 by writing a 1 to this bit (selective clear). If Wait_host 80 is false and microprocessor interface 11 clears ALU_Done 90, ALU 10 exits idle and begins executing a translation independent of host commands.

Operation of ALU

With reference to FIGS. 1 through 11, inclusive, in accordance with the present invention, ALU 10 is a programmable sequencer optimized for performing address translations. ALU 10 may be considered a microprocessor interface 11 resource, available to microprocessor interface 11 to accelerate, automate, or both address translation tasks.

ALU 10 performs:

(1) LCHS to LBA conversion where an LCHS is provided from a host task file;

(2) LBA or LCH to PCH conversion with an LBA or LCHS, respectively, from host interface 12, with automatic selection between LBA and LCHS;

(3) LBA to PCHS conversion with an LBA loaded by microprocessor interface 11;

(4) A binary search of DDT 40 with LBA from host interface 12;

(5) A binary search of DDT 40 with an LBA loaded by microprocessor interface 11;

(6) A calculation of PCHS given microprocessor interface 11 loads all operands;

(7) Multiply, arbitrary integer math (with size restrictions in accordance with the embodiment disclosed herein); and (8) Divide, arbitrary integer math (with size restrictions in accordance with the embodiment described herein).

Items 3–8, above, are subsets of Item 2. Items 3–8 include: fetching an LBA from host interface 12; binary search of DDT 40 for the entry with an LBA which is the greatest value less than or equal to the current TLBA; fetching an appropriate PZT entry; and calculating a PCHS (such calculation includes multiplies and divides). ALU 10 can load its results to media manager 13 by setting bit 5 of ALU_Control Register 75. For a serpentine seek, an LBA to PCHS set of instructions is selected with Serp_Rec 77, bit 4 of the ALU Control Register 75. ALU 10 sequencer map may be hard coded for cost reduction.

ALU 10 is configured to perform a specific task by setting a configuration register, starting instruction address register and an ending instruction address register. These registers maintain their values unless changed by microprocessor interface 11. The same task can be executed repeatedly by means of a simple one-bit handshake between microprocessor interface 11 and ALU 10 or on each host interface 12 command received (Cmd_Rcvd 43). More complete description of these tasks is provided elsewhere herein. Mapping between the above tasks 1–8 and instruction pointer settings are shown in Table II, namely, an ALU Task Configuration Table, (shown elsewhere herein).

ALU 10 has two basic modes of operation. In Wait_host 80 equal to zero (Wait_Host=0) mode (manual mode), execution of a set of instructions is completely under control of microprocessor interface 11. Handshaking between microprocessor interface 11 and ALU 10 is performed through ALU_Done 90, bit 0 of ALU_Status Register 82. By clearing ALU_Done 90, microprocessor interface 11 causes ALU 10 to come out of its idle state and execute selected instructions, provided all other conditions which normally would cause ALU 10 to remain in idle are not active. ALU 10 sets ALU_Done 90 when execution of the set of instructions is complete.

In Wait_host 80 equal to one (Wait_Host=1) mode (auto-start mode), ALU 10 starts to execute a set of instruction as soon as a new host command (Cmd_Rcvd 43) is received. If ALU 10 is in the process of processing a prior set of instructions and a subsequent host command (Cmd_Rcvd 43) is received, ALU 10 aborts the current set of instructions in process and restarts with a new set of instructions. Microprocessor interface 11 must ensure that register reads occur when ALU 10 is idle. This can be accomplished by turning off Wait_Host 80, namely, waiting for or verifying that ALU_Done 90 is set, or by ensuring that no subsequent host commands will occur during register reads.

Therefore, it should be understood that ALU 10 in accordance with the present invention is programmable. Besides providing LBA to PBA conversion, ALU 10 provides a user interface allowing a pointer to be set into one or more instructions and execute them. Thus, ALU 10 in manual mode may be used to single step through instructions, to execute one or more subsets of instructions, or to do a combination of both. In this manner, ALU 10 may be programmed to do variations on routines, and is not locked into the auto-start mode.

Table II is an ALU task configuration table.

TABLE II

| Task No. | PC = PC_Start_Addr | PC_End Addr |
| --- | --- | --- |
| 1 | 00h | 07h |
| 2 | 00h | 1Dh |
| 3 | 07h | 1Dh |
| 4 | 00h | 0Ch |
| 5 | 07h | 0Ch |
| 6 | 11h | 1Dh |
| 7 | 04h | 05h |
| 8 | 15h | 16h |

These eight tasks represent activities undertaken in accordance with the present invention. The activities are described elsewhere herein. However, for the tasks to take place, certain registers need to be initialized.

Task No. 1 requires loading of Reg 1 with logical head/drive information (e.g., #Heads (number of heads) on disk drive 22), and requires loading Reg 2 with logical sector/track information used in LCHS to LBA conversion.

Task No. 2 requires loading of DDT_Virtual_Size, DDT_Base 42, PZT_Base 52, PZT_Entry_Size, DDT_Up_Limit and Reg 1 with logical heads/drive.

Task No. 3 is the same as the second task with the addition of loading an LBA value. The LBA value may be provided by host interface 12 or microprocessor interface 11.

Task No. 4 requires loading of DDT_Virtual_Size, DDT_Base 42, and DDT_Up_Limit.

Task No. 5 is the same as Task No. 4 plus loading an LBA value. The LBA value may be provided by host interface 12 or microprocessor interface 11.

Figure 12A:
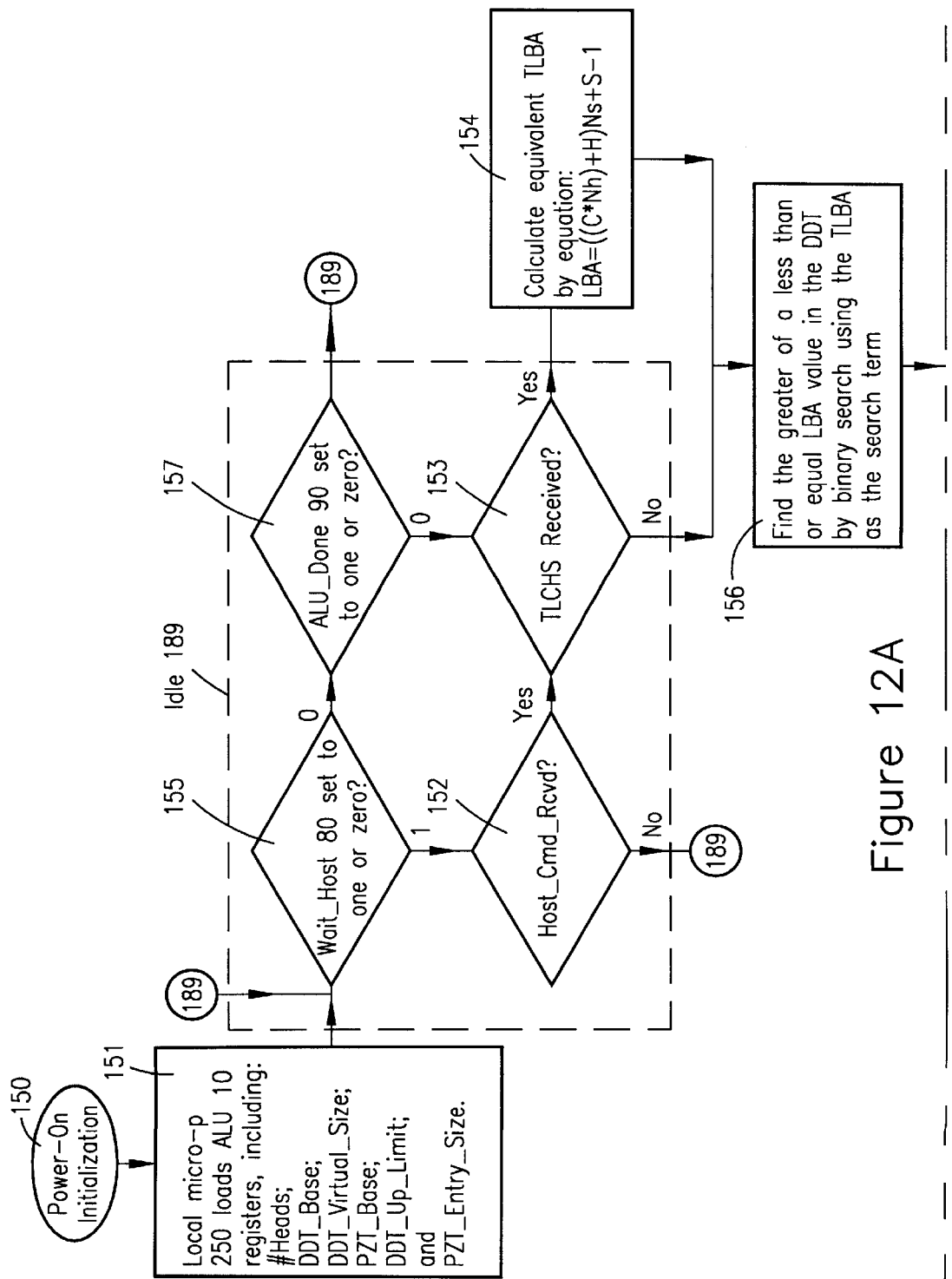
FIG. 12 is a flow chart for illustrating address translation in accordance with the present invention.
Figure 12B:
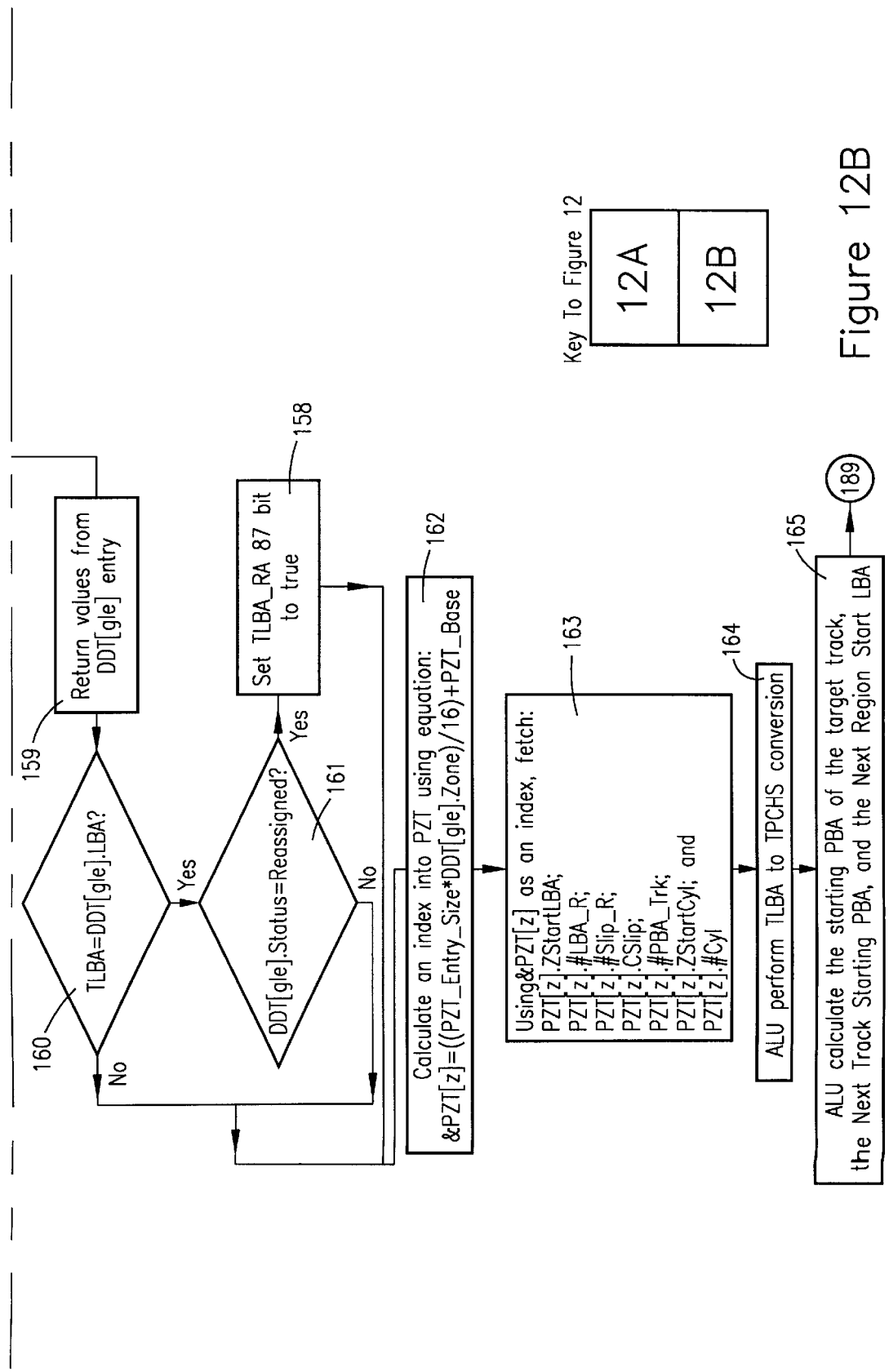
Figure 13A:
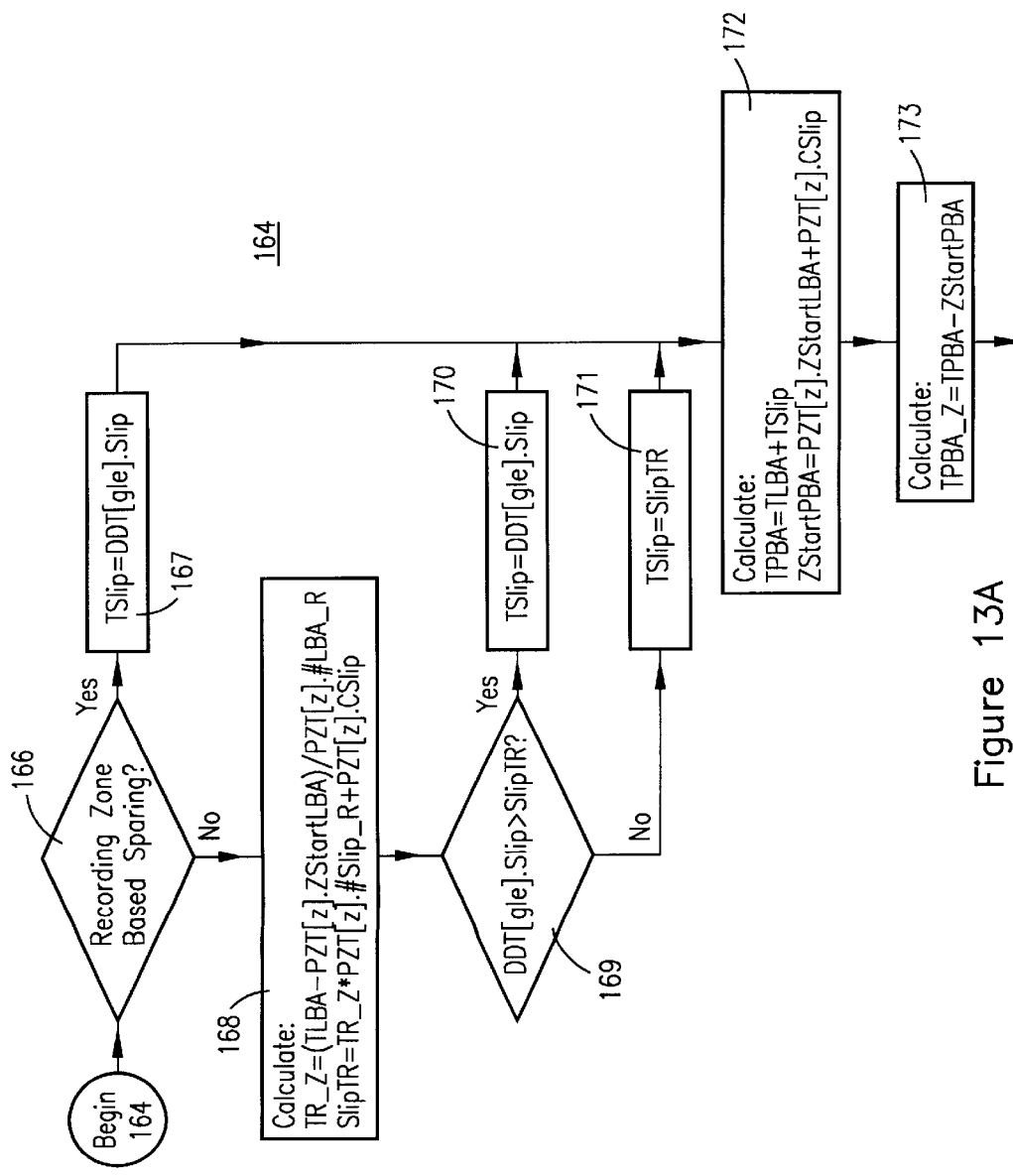
FIG. 13 is a flow chart for illustrating a subset of instructions for TLBA to TPCHS translation in accordance with the present invention.
Figure 13B:
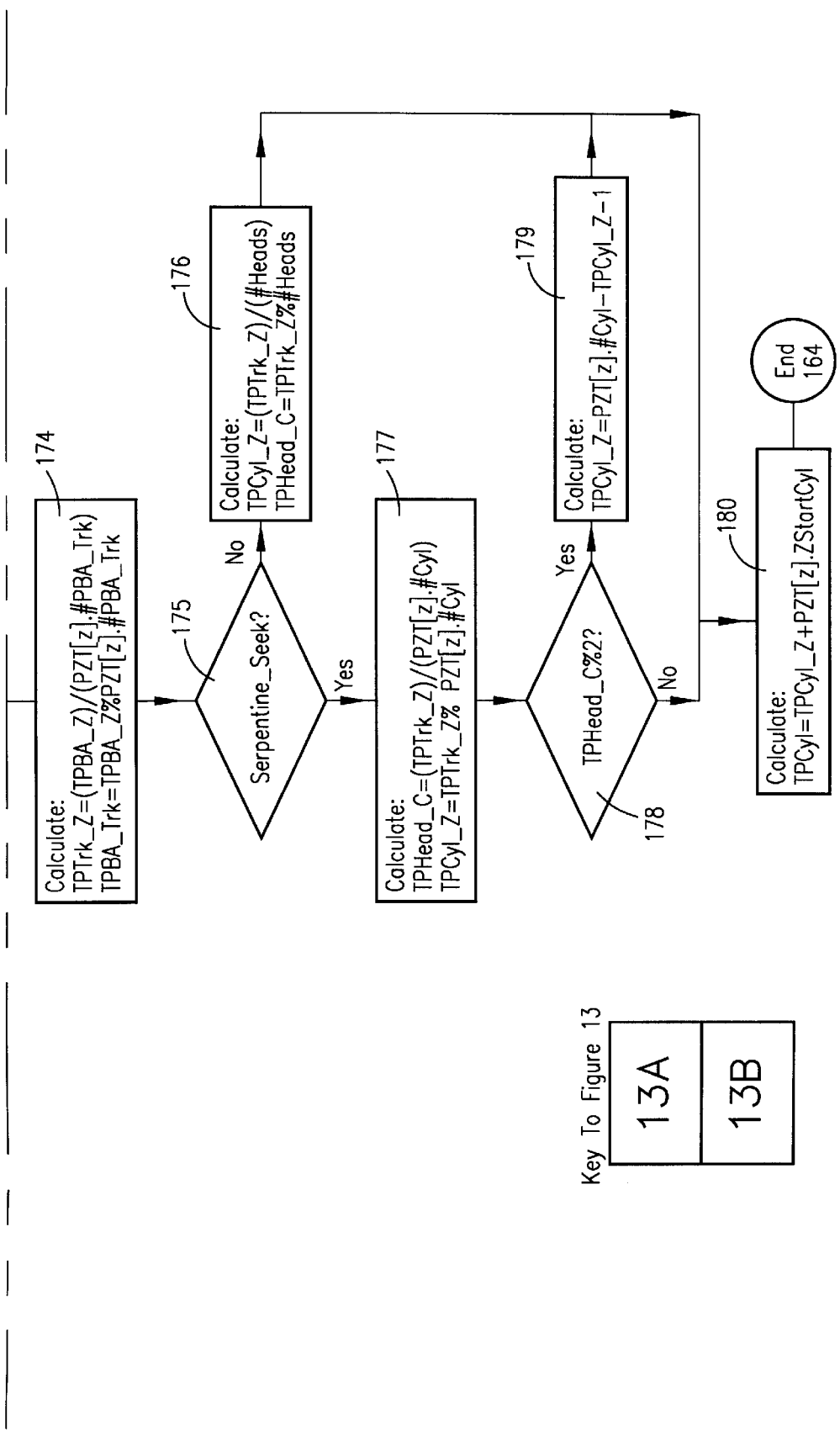
Figure 14:
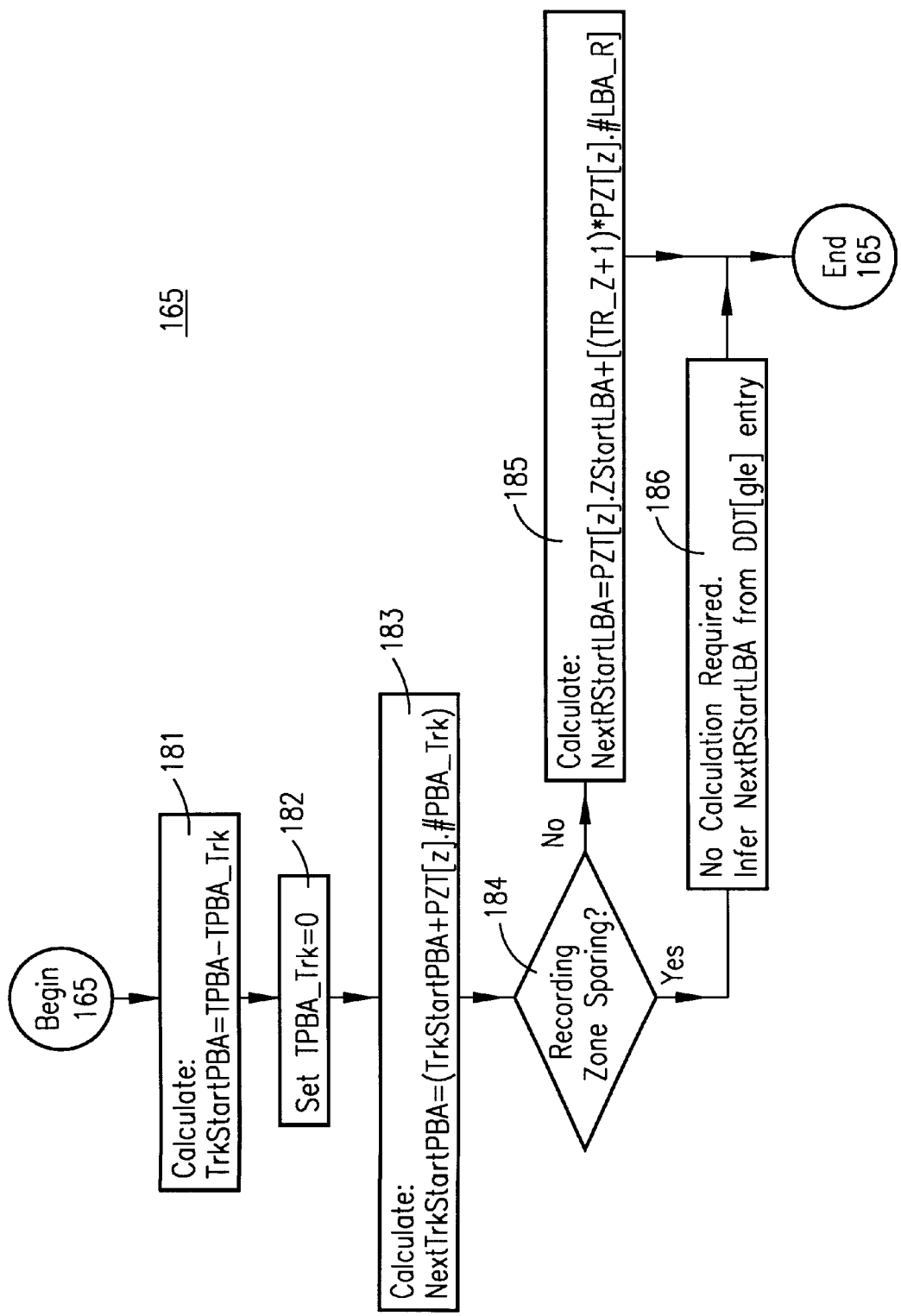
FIG. 14 is a flow chart for illustrating a subset of instructions for calculating starting PBAs and a starting LBA in accordance with the present invention.

Task No. 6 relates to FIGS. 12 through 14, inclusive, and loading of the registers for the process steps associated with those Figs.

Task No. 7 requires loading of Q_Reg and M_Reg.

Task No. 8 requires loading of Q_Reg and M_Reg.

Each of the above-named registers for the above-identified tasks are described with respect to Table I herein.

In Table II, PC_Start_Address (program counter starting address) and PC_End_Addr (program counter ending address) are provided in accordance with the embodiment described herein, for each Task No. 1 through 8, inclusive. The physical locations of these values are hard coded for ALU 10 for the embodiment described herein.

Referring to FIG. 12, there is shown a flow chart for illustrating address translation in accordance with the present invention. After power initialization 150 at step 151, microprocessor interface 11 loads ALU 10 registers, including: #Heads, DDT_Base 42, DDT_Virtual_Size, DDT_Up_Limit, PZT_Base 52, and PZT_Entry_Size.

Referring again to FIG. 12, at decision step 155, Wait_host 80 is set to a zero or a one. If Wait_host 80 is set to a one, then ALU 10 will exit idle state 189 if a host command is received. ALU 10 can start processing any received logical address at step 153. If Wait_host 80 is set to a one, ALU 10 automatically clears ALU_Done 90 bit. By automatically clearing ALU_Done 90, as mentioned above, ALU 10 autonomously translates a logical addresses to a physical addresses without microprocessor 11 intervention. If no Host_Cmd_Rcvd 43 is received by ALU 10 at step 152, ALU 10 remains in idle state 189.

If Wait_host 80 is set to zero (cleared), ALU 10 gets out of idle state 189 if ALU_Done 90 is cleared by a signal from microprocessor interface 11 at step 157. Thus, microprocessor interface 11 can control operation (manual mode) of ALU 10 by setting ALU_Done 90 to zero at step 157 for execution of a portion or all of steps 153 through 165, including the substeps of steps 164 and 165 shown elsewhere herein.

At decision step 153, ALU 10 also receives a TLBA or TLCHS from host interface 12 via Host_LBA_LCHS 45. If a TLCHS is received to ALU 10, microprocessor interface 11 mathematically converts the TLCHS to a TLBA at step 154. The equation for this is: LBA=((((C*Nh)+H)*Ns)+S−1), where C is the logical cylinder associated with the TLCHS; H is the logical head associated with the TLCHS; S is the logical sector associated with the TLCHS; Nh is the logical heads/drive associated with the TLCHS; and Ns is the logical sectors/track associated with the TLCHS. The TLBA is stored in Reg 20 through 23, inclusive, of ALU 10.

At step 156, ALU 10 performs a binary search of DDT 40. ALU 10 locates a DDT 40 entry having the greatest LBA which is less than or equal to the TLBA from an LBA in LBA field 35. The value found is DDT[gle].LBA. The DDT 40 entry associated with DDT[gle].LBA also has other information including recording zone values from zone field 32, namely, DDT[gle].Zone. DDT[gle].Zone indicates in which zone the TLBA is located. The found DDT[gle] entry also contains a status (DDT[gle].Status) and slip (DDT[gle].Slip) (collectively, "defect") information and an entry for the first LBA of each recording zone stored in field 32.

At step 159, values from the found DDT[gle] entry are retrieved from memory 16 and to registers of ALU 10, namely, Reg 7, Reg 18, and Reg 19. Next, the returned DDT[gle].LBA is checked to determine if it is a reassigned sector. At decision step 160, if the TLBA equals DDT[gle].LBA and, at decision step 161, if DDT[gle].Status equals reassigned, then the reassigned status bit (TLBA_RA 87 of status register 82) is set at step 158.

ALU 10 performs indexed fetch from PZT 50 after having retrieved the DDT 40 entry with the greatest of a less than or equal LBA value. At step 162, an index, &PZT[z] (a PZT address), is calculated from equation:

&PZT[z]=((PZT_Entry_Size*DDT[gle].Zone)/#)+PZT_Base (1)

The "&" is used to indicate an address. It should be understood the PZT_Base 52 in equation (1) is a pointer to a starting point address of PZT 0. Thus, the first part of equation (1) must be divided by a number, "#", which is a function of the paragraph or block size fetched from memory. The number of bytes or words on each memory access is 16 for the embodiment described herein.

Figure 15:
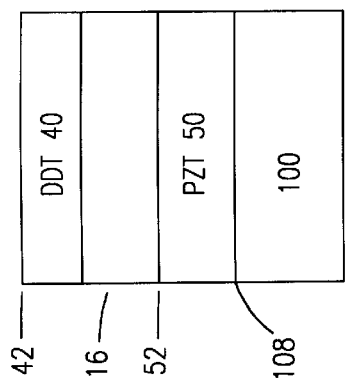
FIG. 15 is a memory having tables in accordance with the present invention.

In other words, referring to FIG. 15, there is shown a memory 16 having tables in accordance with the present invention. Tables 40, 50, and 100 may be spaced apart, as illustratively shown, or concatenated. Each address 42, 52, and 108 indicates the beginning of its associated table. Thus, equation (1) allows ALU 10 to point at record z (z is an integer described elsewhere herein with respect to PZT 50) of PZT 50 stored in memory 16. This pointer is then used to retrieve information in fields in record z of PZT 50.

Referring again to FIG. 12, at step 163, ALU 10 uses &PZT[z] as an index to fetch information from PZT 50. This information includes some or all of the following: PZT[z].ZStartLBA 68 (zone starting LBA), PZT[z].#LBA_R 63 (number of LBAs within a sparing region), PZT[z].#Slip_R 62 (number of slipped sectors within a sparing region), PZT[z].CSlip 67 (cumulative slip to beginning of zone), PZT[z].#PBA_Trk 65 (number of PBAs per track), PZT[z].ZStartCyl 66 (zone starting cylinder), and PZT[z].#Cyl 64 (number of cylinders in recording zone z). When some or all of the above information needs to be retrieved from PZT[z] 50, depends on whether or not recording based sparing is used and whether or not serpentine seeking is used.

At step 164, ALU 10 performs TLBA to TPBA conversion then a TPBA to TPCHS conversion.

Referring to FIG. 13, there is shown a flow chart for illustrating a subset of instructions for TLBA to TPCHS translation in accordance with the present invention.

At step 166, if the recording zone is based sparing, then at step 167 set TSlip (Target Slip) equal to DDT[gle].Slip. Recording zone based sparing implies that an entry for each LBA that follows a sparing region is present in DDT 40.

A target sparing region relative to start of the zone (TR_Z) is equal to the quantity TLBA minus PZT[z].ZStartLBA divided by PZT[z].#LBA_R. Next the total slip to the start of the target sparing region is calculated relative to the start of the drive. The total slip (SlipTR) is the quantity TR_Z times PZT[z].#Slip_R plus PZT[z].CSlip. If there are any defects beyond the start of the sparing region but before the TLBA, the slip in DDT[gle] (DDT[gle].Slip) will be greater then the SlipTR just calculated. This is checked at decision step 169. If DDT[gle].Slip is greater than SlipTR, then TSlip is set equal to DDT[gle].Slip at step 170. Otherwise, TSlip is set equal to SlipTR at step 171. If recording zone base sparing is not true for DDT 40, then target sparing region calculations begin at step 168.

From either step 167, 170 or 171, follows step 172 for calculating a TPBA and zone starting PBA. TPBA is equal to TLBA plus TSlip. ZStartPBA equals PZT[z].ZStartLBA plus PZT[z].CSlip. It is now possible to calculate the physical cylinder and head. First, the TPBA relative to the zone starting PBA (ZStartPBA) is determined at step 173, namely:

$$TPBA\_Z=TPBA-ZStartPBA \quad (2)$$

Next the target physical track (TPTrk) relative to the start of the zone (TPTrk_Z) is calculated at step 174, namely:

$$TPTrk\_Z=TPBA\_Z \div PZT[z].\#PBA\_Trk \quad (3)$$

The residue of this calculation (equation (3)) returns the TPBA relative to the start of the track.

The residue of equation (3) is:

$$TPBA\_Trk=TPBA\_Z \ \% PZT[z].\#PBA\_Trk \quad (4)$$

Notably, "%" (or "MOD") yields a remainder.

Now, the target physical cylinder (TPCyl) relative to the start of the zone may be calculated, with the residue providing the target physical head (TPHead) within the target cylinder. The opposite of the above situation applies for serpentine seek.

If a non-serpentine seek is used at decision step 175, then, at step 176:

$$TPCyl\_Z=TPTrk\_Z \div \#Heads \quad (5)$$

$$TPHead\ C=TPTrk\_Z\ \%\#Heads (\text{namely, the residue of equation(5)}) \quad (6)$$

If a serpentine seek is used at decision step 175, then, at step 177, $$TPHead\_C = TPTrk\_Z \div PZT[z].\#Cyl \qquad (7)$$

$$TPCyl\_Z = TPTrk\_Z \% PZT[z].\#Cyl \text{(namely, the residue of equation(7))} \qquad (8)$$

If TPHead_C % 2 yields a remainder (i.e., not equal to zero) at decision step 178, then, at step 179, $$TPCyl\_Z = PZT[z].\#Cyl - TPCyl\_Z - 1 \qquad (9)$$

The TPCyl relative to the start of the drive can then be found using the PZT[z] entry that describes the zone starting cylinder. In other words, step 180 follows from either step 176, 178 or 179, where:

$$TPCyl = TPCyl\_Z + PZT[z].ZStartCyl \qquad (10)$$

Referring again to FIG. 12, ALU 10 then may calculate the Starting PBA of the target track, the Next Track Starting PBA, and the Next Region Starting LBA at step 165.

Referring to FIG. 14, there is shown a flow chart for illustrating a subset of instructions for calculating starting PBAs and a starting LBA in accordance with the present invention. The track starting PBA is needed later to calculate the current PBA. It is found using the target PBA relative to the start of the track, namely at step 181, TrkStartPBA is set equal to the TPBA minus TPBA_Trk. This result also allows the calculation of NextTrkStartPBA. At step 182, TPBA_Trk is set equal to zero as the correct value when starting the next track. At step 183, NextTrkStartPBA is found by taking TrkStartPBA plus PZT[z].#PBA_Trk.

If recording zone sparing is used at decision step 184, then no calculation is required at step 186 as NextRStartLBA is the end of the current zone and is inferred automatically from an entry in DDT[gle] that marks the beginning of the next zone. If recording zone sparing is not used at decision step 184, then at step 185 NextRStartLBA is calculated:

$$NextRStartLBA = PZT[z].ZStartLBA + [(TR\_Z + 1) * PZT[z].\#LBA\_R]$$

Figure 16A:
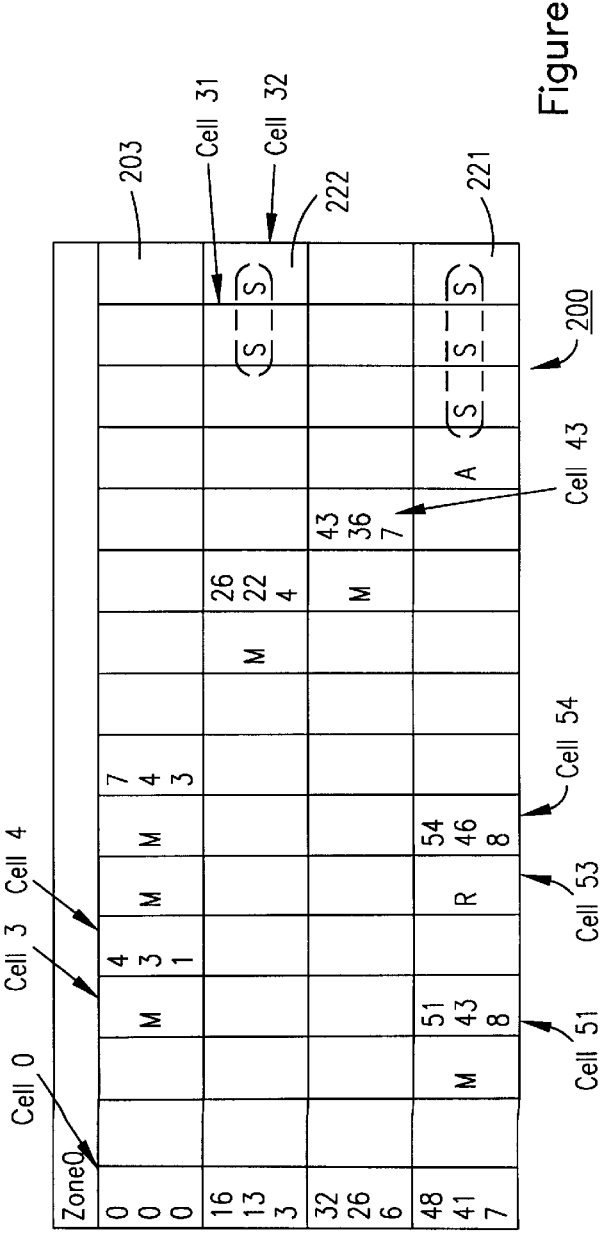
FIG. 16 is a diagram illustrating a hypothetical recording zone, DDT entries and PZT entries in accordance with the present invention.
Figure 16B:
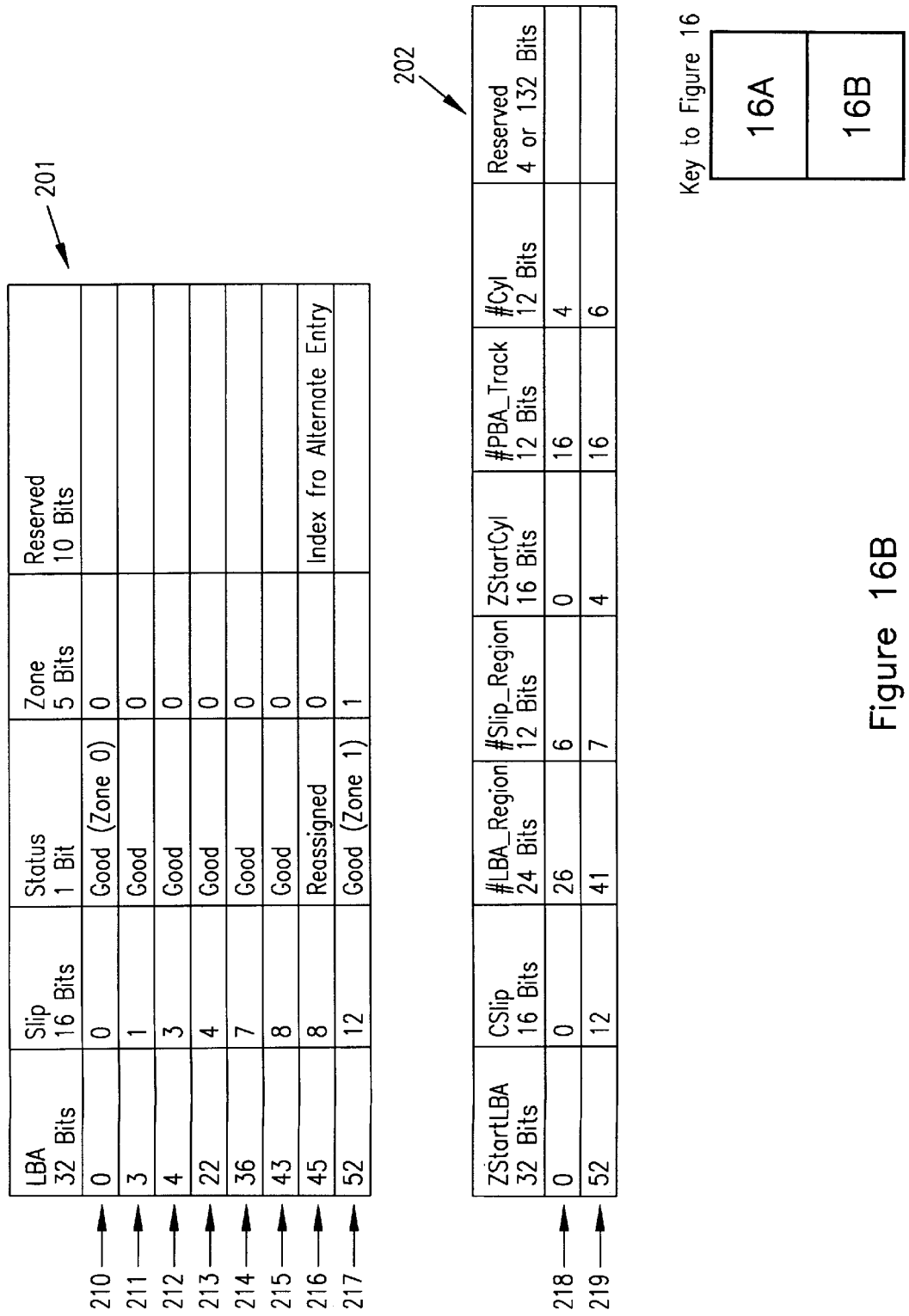

Referring to FIG. 16, there is shown a diagram illustrating hypothetical recording zone 200, DDT entries 201, and PZT entries 202 in accordance with the present invention.

FIG. 16 is for a hypothetical drive having 1 head. In zone 200, M represents a factory mapped out sector; R represents a host reassigned sector; and A represents an alternate sector. Each cell 203 in zone 200 has three parameters, namely, a PBA, a LBA, and a slip value. The PBA is the unique physical address of each sector on the hypothetical drive. The LBA is the unique logical address of each user sector on the hypothetical drive. The slip value is the number of sectors that an LBA has been pushed or shifted from a starting location of the drive. For example, if the start of the drive is a reference indexed to cylinder 0, head 0, the slip value is the amount shifted from that reference location. For example, cell 0 represents cylinder 0, head 0. It has a PBA of 0, an LBA of 0, and a slip value of 0. Cell 3 is a factory mapped out sector. Cell 3 has a PBA of 3. Owing to cell 3 being a factory mapped out sector preceding cell 4, cell 4 has an LBA of 3 and a slip value of 1. In other words, the physical address has been shifted 1 logical address unit. Cells 5 and 6 are both factory mapped out sectors, and so cell 7 has a LBA of 4 and a slip value of 3 to account for the 3 preceding factory mapped out sectors. Thus, it should be understood that the LBA and slip value are cumulative.

Cells 31 and 32 having a PBA of 31 and 32, respectively, form a sparing region 222. Owing to cells 31 and 32 being part of sparing region 222 and the factory mapped out sectors preceding cell 43, its LBA is shifted by a slip value of 7 to a value of 36.

In Zone0, cell 53 is a host reassigned sector. A host reassigned sector has no effect on change in slip value. Consequently, cell 54 has a PBA of 54, an LBA of 46, and a slip value of 8. Thus, the slip value has not changed as from cell 51 to cell 54.

Recording Zone0, having a starting PBA of 0 and an ending PBA of 63, has two sparing regions 221 and 222. Each sparing region has six (6) spares, or six spares per region as indicated by #Slip_Region (PZT[0].#Slip_R) in entry 218 of PZT 50.

Entries 201 are part of DDT 40 stored in memory 16. Each entry 210 through 216, inclusive, relates to zone 200. Entry 217 is for a zone following zone 200, namely Zone1, and so on.

As shown, DDT 40 stores information on the first cell (cell 0) of zone 200, independent of what type of cell it is. DDT 40 also stores cell information on each valid data cell immediately following a factory mapped sector (cell); entries 211 through 215, inclusive, provide such information. DDT 40 also stores information on each reassign cell 53, as indicated by entry 216. Reserved bits may be used to provide an index to an alternate entry in DDT 40 for a reassigned cell.

PZT 50 entries 202 are for each zone. Entry 218 is for zone 200 (Zone0), and entry 219 is for Zone1, and so on.

Referring to FIGS. 12, 13 and 14 in combination with FIG. 16, suppose ALU 10 receives a TLBA equal to 4. After a binary search of DDT 40 in memory 16, an entry 212 will be found, namely, DDT[gle] 212. Hence, LBA=4, Zone=0, Status=good, and Slip=3. A &PZT[0] index will be calculated to locate entry 218 in PZT 50.

Hence, at step 163 PZT[0].ZStartLBA=0, PZT[0].CSlip=0, PZT[0].#LBA_R=26, PZT[0].#Slip_R=6, PZT[0].ZStartCyl=0, and PZT[0].#PBA_Trk=16.

Assuming, no recording zone based sparing at step 166, from step 168, TR_Z=(4−0)/26=0 owing integer restriction on target sparing region in relation to start of the zone. This number will be not be rounded up for any remainder, rather the remainder provides the residue. The residue of the TR_Z calculation provides the TLBA in relation to the target sparing region, namely, TLBA_R=(TLBA−PZT[z].ZStartLBA) % PZT[z].#LBA_R. For this example, TLBA_R=(4−0) % 26=4. In other words, the remainder is four (4).

At step 168, SlipTR=(0)(6)+0=0.

At step 169, DDT[2].Slip=3 and SlipTR=0, so at step 170, TSlip is set equal to 3.

At step 172, TPBA=4+3=7 and ZStartPBA=0+0=0.

At step 173, TPBA_Z=(7−0)=7.

At step 174, TPTrk_Z=(7)/(16)=0, and TPBA_Trk=7% 16=7.

Assuming a non-serpentine seek at step 175, which is a reason PZT[z].#Cyl does not need to be retrieved at step 163, at step 176, TPCyl_Z=0/1=0 (recall the hypothetical drive only has one head), and TPHead=0% 1=0.

At step 180, TPCyl=0+0=0.

At step 181, TrkStartPBA=7−7=0.

At step 182, TrkPBA_Trk is set to zero for the next track.

At step 183, NextTrkStartPBA=0+16=16.

At step 185, as it was earlier assumed no recording zone sparing, NextRStartLBA=0+((0+1) 26)=26.

This is merely one numerical example of an application of the present invention; however, it should be understood that many values may be used other than the ones employed here for exemplification. Consequently, the present invention should not be construed as being limited to the numerical example set forth herein.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. For example, the equations implemented herein are mathematically limited by capabilities of the embodiment described herein; thus, size constraints have been imposed. However, other variations on component capabilities may be used without departing from the scope of the present invention. While the embodiment herein supports storage for a terabyte of information, other storage size capabilities may be accommodated in accordance with the present invention. The inventions illustratively disclosed herein may be practiced without any element which is not specifically disclosed herein.

| GLOSSARY OF TERMS | |
|---|---|
| ALU | Address translation Logic Unit. |
| #Heads (3:0) | Number of heads per cylinder. |
| #Servos (7:0) | Number of servos per track. |
| DDT | Defect description table. |
| &DDT (19:0) | DRAM address (in bytes or words) for the DDT entry. |
| DDT[gle].LBA (31:0) | The LBA value returned from the DDT entry with the greater of a less than equal LBA. |
| DDT[gle].Slip (15:0) | The slip from the beginning of the drive to the greater of a less than or equal LBA. |
| DDT[gle].Status (0) | The status value returned from the DDT entry with the greater of a less than or equal LBA. |
| DDT[gle].Zone (4:0) | The zone value returned from the DDT entry with the greater of a less than or equal LBA. |
| DDT_Base (15:0) | Base address (in DRAM paragraphs) of the DDT. |
| DDT_Size (15:0) | Size of the DDT (in bytes). |
| NextTrkStartPBA (31:0) | Next track starting PBA relative to the start of the drive. |
| NextRStartLBA (31:0) | Next region starting LBA. |
| PZT | Physical zone table. |
| PZT[z].#LBA_R (23:0) | Number of LBAs per sparing region. |
| PZT[z].#PBA_Trk (11:0) | Number of PBAs per track. |
| PZT[z].#Slip_R (11:0) | Number of slipped sectors per sparing region. |
| PZT[z].#Cyl (11:0) | Number of cylinders in the zone. |
| PZT[z].CSlip (15:0) | Cumulative slip to the beginning of the zone from the start of the drive. |
| PZT[z].ZStartCyl (15:0) | Zone starting cylinder. |
| PZT[z].ZStartLBA (31:0) | Zone starting LBA. |
| PZT_Base (15:0) | Base address (in DRAM paragraphs) of the PZT. |
| PZT_Entry_Size (7:0) | Number of bytes per PZT entry. |
| &PZT[z] (19:0) | DRAM address (in bytes or words) for the PZT entry which is indexed by DDT[gle].Zone. |
| Track_Skew (7:0) | Number of data wedges after a reference index which are skipped before the beginning of the logical track. |
| SlipTR (15:0) | Slip of the target sparing region from the start of the zone. |
| TDT | Track description table. |
| TDT_Zone_Base (19:0) | Base address (in bytes or words) of the TDT for the current zone. |
| TLBA (31:0) | Target LBA to be transferred to the host. |
| TPBA (31:0) | Target PBA relative to the start of the drive. |
| TPBA_Trk (11:0) | Target PBA relative to the start of the track. |
| TPBA_Z (23:0) | Target PBA relative to the start of the zone. |
| TPCyl (15:0) | Target physical cylinder relative to the start of the drive. |
| TPCyl_Z (11:0) | Target physical cylinder relative to the start of the zone. |
| TPHead_C (3:0) | Target physical head relative to the start of the cylinder. |
| TPTrk_Z (11:0) | Target physical track relative to the start of the zone. |
| TR_Z (11:0) | Target sparing region relative to the start of the zone. |
| TrkStartPBA (31:0) | Track starting PBA relative to the start of the drive. |
| TSlip (15:0) | The slip of the target LBA (TLBA) relative to the start of the drive. |
| ZStartingPBA (31:0) | Zone starting PBA. |
| [gle] | Greater of a less than or equal. |
| Sparing Region | A region of valid data followed by a group of spared sectors. For the embodiment described herein, sparing region may be equivalent to a zone. |

What is claimed is:

1. A method for a disc controller, the disc controller coupled between a computer system and a disc drive, the disc drive including disk media, the disk media having at least one recording zone, the recording zone having a plurality of sectors and a plurality of tracks, the disc drive including a plurality of registers, a microprocessor, and a memory including a plurality of tables for conversion of a target logical block address into a target physical address, the target physical address being a target physical block address, the method comprising the steps of:

provocation the target logical address to an address translation unit from a host interface;

determining with the address translation unit that the target logical address is a target logical block address;

searching by the address translation unit a first accessed one of the plurality of tables for a greatest logical block address which is not greater than the target logical block address;

determining with the address translation unit an index to a second accessed one of the plurality of tables for fetching information for converting the target logical block address into the target physical address, the first accessed one of the plurality of tables being a defect description table, and the second accessed one of the plurality of tables being a physical zone table; and converting with the address translation unit the target logical address block address into the target physical address, the defect description table including sector information on each of the plurality of sectors, the sector information including status of each one of said plurality of sectors, the recording zone associated with each of said plurality of sectors, and a logical block address for each of the plurality of sectors.

2. The method of claim 1 wherein the sector information further includes a slip value for ones of said plurality of sectors, and ones of said recording zones include at least one sparing region.

3. The method of claim 2 wherein the microprocessor loads the plurality of registers for storing information on number of heads per cylinder, defect description table base address, defect description table size, physical zone table base address, and physical zone table entry size.

4. The method of claim 3 wherein the address translation unit determines the index into the physical zone table, the index being determined from the physical zone table entry size, the recording zone associated with the greatest logical block address found, and the physical zone table base address.

5. The method of claim 4 wherein the physical zone table includes zone information on each said recording zone of the disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

6. The method of claim 5 wherein the host interface does not use recording based zone sparing, and the disk drive does use serpentine seeking.

7. The method of claim 6 wherein the address translation unit determines a target sparing region relative to a start of the recording zone, and a calculated slip value of the target sparing region relative to a start of the recording zone.

8. The method of claim 7 wherein the address translation unit determines which, as between the calculated slip value and the slip value found in the defect description table, a target slip value is to equal, the target slip value being for the target logical block address relative to a start of the disk drive.

9. The method of claim 5 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

10. The method of claim 9 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

11. The method of claim 10 wherein if the cylinder relative target physical head has no remainder when divided by two, the address translation unit directly determines a target physical cylinder by adding the number of the starting cylinder for the recording zone to the zone relative target physical cylinder.

12. The method of claim 11 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

13. The method of claim 4 wherein the physical zone table includes zone information on each said recording zone of the disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, and number of a starting cylinder for each said recording zone.

14. The method of claim 13 wherein the host interface does not use recording based zone sparing, and the disk drive does not use serpentine seeking.

15. The method of claim 14 wherein the address translation unit determines a target sparing region relative a to start of the recording zone, and a calculated slip value of the target sparing region relative to a start of the recording zone.

16. The method of claim 15 wherein the address translation unit determines which, as between the calculated slip value and the slip value found in the defect description table, a target slip value is to equal, the target slip value being for the target logical block address relative to a start of the disk drive.

17. The method of claim 13 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

18. The method of claim 17 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

19. The method of claim 18 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

20. The method of claim 4 wherein the physical zone table includes zone information on each said recording zone of the disk media, the zone information including starting logical block address for each said recording zone, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

21. The method of claim 20 wherein the host interface does use recording based zone sparing, and the disk drive does use serpentine seeking.

22. The method of claim 21 wherein the address translation unit sets a target slip value equal to the slip value found in the defect description table, the target slip value being for the target logical block address relative to a start of the disk drive.

23. The method of claims 20 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

24. The method of claim 23 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

25. The method of claim 24 wherein if the cylinder relative target physical head has no remainder when divided by two, the address translation unit directly determines a target physical cylinder by adding the number of the starting cylinder for the recording zone to the zone relative target physical cylinder.

26. The method of claim 25 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

27. The method of claim 4 wherein the physical zone table includes zone information on each said recording zone of the disk media, the zone information including a starting logical block address for each said recording zone, cumulative slip count to the beginning of each said recording zone from a starting one of said plurality of sectors of the disc drive, number of physical block addresses for each one of said tracks, and number of a starting cylinder for each said recording zone.

28. The method of claim 27 wherein the host interface does use recording based zone sparing, and the disk drive does not use serpentine seeking.

29. The method of claim 28 wherein the address translation unit sets a target slip value equal to the slip value found in the defect description table, the target slip value being for the target logical block address relative to a start of the disk drive.

30. The method of claim 27 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

31. The method of claim 30 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

32. The method of claim 31 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

33. An apparatus for a disc controller, the disc controller coupled between a computer system and a disc drive, the disc drive including disk media, the disk media having at least one recording zone, the recording zone having a plurality of sectors and a plurality of tracks, the apparatus comprising:

a host interface operative in combination with the computer system;

a address translation unit operative in combination with the host interface;

a microprocessor operative in combination with the address translation unit;

a first memory operative in combination with the address translation unit; and a second memory operative in combination with the first memory;

the microprocessor loading a plurality of registers;

the host interface providing a target logical address to the address translation unit;

the address translation unit determining that the target logical address is a target logical block address;

the second memory including a plurality of tables for conversion of the target logical block address into a target physical address, said target physical address being a target physical block address;

the address translation unit searching a first accessed one of the plurality of tables for a greatest logical block address which is not greater than the target logical block address;

the address translation unit determining an index to a second accessed one of the plurality of tables for fetching information for converting the target logical block address into the target physical address;

the first accessed one of the plurality of tables being a defect description table, and the second accessed one of the plurality of tables being a physical zone table;

the address translation unit converting the target logical address block address into the target physical address; and the defect description table including sector information on each of the plurality of sectors, the sector information including status of each one of said plurality of sectors, the recording zone associated with each of said plurality of sectors, and a logical block address for each of the plurality of sectors.

34. The apparatus of claim 33 wherein the sector information further includes a slip value for ones of said plurality of sectors, and ones of said recording zones include at least one sparing region.

35. The apparatus of claim 34 wherein the microprocessor loads the plurality of registers for storing information on number of heads per cylinder, defect description table base address, defect description table size, physical zone table base address, and physical zone table entry size.

36. The apparatus of claim 35 wherein the address translation unit determines the index into the physical zone table, the index being determined from the physical zone table entry size, the recording zone associated with the greatest logical block address found, and the physical zone table base address.

37. The apparatus of claim 36 wherein the physical zone table includes zone information on each said recording zone of the disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

38. The apparatus of claim 37 wherein the host interface does not use recording based zone sparing, and the disk drive does use serpentine seeking.

39. The apparatus of claim 38 wherein the address translation unit determines a target sparing region relative to a start of the recording zone, and a calculated slip value of the target sparing region relative to a start of the recording zone.

40. The apparatus of claim 39 wherein the address translation unit determines which, as between the calculated slip value and the slip value found in the defect description table, a target slip value is to equal, the target slip value being for the target logical block address relative to a start of the disk drive.

41. The apparatus of claim 37 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

42. The apparatus of claim 41 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

43. The apparatus of claim 42 wherein if the cylinder relative target physical head has no remainder when divided by two, the address translation unit directly determines a target physical cylinder by adding the number of the starting cylinder for the recording zone to the zone relative target physical cylinder.

44. The apparatus of claim 43 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

45. The apparatus of claim 36 wherein the physical zone table includes zone information on each said recording zone of tire disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, and number of a starting cylinder for each said recording zone.

46. The apparatus of claim 45 wherein the host interface does not use recording based zone sparing, and the disk drive does not use serpentine seeking.

47. The apparatus of claim 46 wherein the address translation unit determines a target sparing region relative to a start of the recording zone, and a calculated slip value of the target sparing region relative to a start of the recording zone.

48. The apparatus of claim 47 wherein the address translation unit determines which, as between the calculated slip value and the slip value found in the defect description table, a target slip value is to equal, the target slip value being for the target logical block address relative to a start of the disk drive.

49. The apparatus of claim 45 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

50. The apparatus of claim 49 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

51. The apparatus of claim 50 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

52. The apparatus of claim 36 wherein the physical zone table includes zone information on each said recording zone of the disk media, the zone information including a starting logical block address for each said recording zone, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

53. The apparatus of claim 52 wherein the host interface does use recording based zone sparing, and the disk drive does use serpentine seeking.

54. The apparatus of claim 53 wherein the address translation unit sets a target slip value equal to the slip value found in the defect description table, the target slip value being for the target logical block address relative to a start of the disk drive.

55. The apparatus of claim 52 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

56. The apparatus of claim 55 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

57. The apparatus of claim 56 wherein if the cylinder relative target physical head has no remainder when divided by two, the address translation unit directly determines a target physical cylinder by adding the number of the starting cylinder for the recording zone to the zone relative target physical cylinder.

58. The apparatus of claim 57 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

59. The apparatus of claim 36 wherein the physical zone table includes zone information on each said recording zone of the disk media, the zone information including a starting logical block address for each said recording zone, cumulative slip count to the beginning of each said recording zone from a starting one of said plurality of sectors of the disc drive, number of physical block addresses for each one of said tracks, and number of a starting cylinder for each said recording zone.

60. The apparatus of claim 59 wherein the host interface does use recording based zone sparing, and the disk drive does not use serpentine seeking.

61. The apparatus of claim 60 wherein the address translation unit sets a target slip value equal to the slip value found in the defect description table, the target slip value being for the target logical block address relative to a start of the disk drive.

62. The apparatus of claim 59 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

63. The apparatus of claim 62 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

64. The apparatus of claim 63 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

65. An apparatus for a disc controller, the disc controller coupled between a computer system and a disc drive, the disc drive including disk media, the disk media having at least one recording zone, the recording zone having a plurality of sectors and a plurality of tracks, the apparatus comprising:

a host interface operative in combination with the computer system;

a address translation unit operative in combination with the host interface;

a microprocessor operative in combination with the address translation unit;

a first memory operative in combination with the address translation unit; and a second memory operative in combination with the first memory;

the microprocessor loading a plurality of registers;

the host interface providing a target logical address to the address translation unit;

the address translation unit determining that the target logical address is a target logical cylinder-head-sector and converting the target logical cylinder-head-sector into a target logical block address;

the second memory including a plurality of tables for conversion of the target logical block address into a target physical address, said target physical address being a target physical block address;

the address translation unit searching a first accessed one of the plurality of tables for a greatest logical block address which is not greater than the target logical block address;

the address translation unit determining an index to a second accessed one of the plurality of tables for fetching information for converting the target logical block address into the target physical address;

the first accessed one of the plurality of tables being a defect description table, and the second accessed one of the plurality of tables being a physical zone table;

the address translation unit converting the target logical address block address into the target physical address; and the defect description table including sector information on each of the plurality of sectors, the sector information including status of each one of said plurality of sectors, the recording zone associated with each of said plurality of sectors, and a logical block address for each of the plurality of sectors.

66. The apparatus of claim 65 wherein the sector information further includes a slip value for ones of said plurality of sectors, and ones of said recording zones include at least one sparing region.

67. The apparatus of claim 66 wherein the microprocessor loads the plurality of registers for storing information on number of heads per cylinder, defect description table base address, defect description table size, physical zone table base address, and physical zone table entry size.

68. The apparatus of claim 67 wherein the address translation unit determines the index into the physical zone table, the index being determined from the physical zone table entry size, the recording zone associated with the greatest logical block address found, and the physical zone table base address.

69. The apparatus of claim 68 wherein the physical zone table includes zone information on each said recording zone of the disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

70. The apparatus of claim 69 wherein the host interface does not use recording based zone sparing, and the disk drive does use serpentine seeking.

71. The apparatus of claim 70 wherein the address translation unit determines a target sparing region relative to a start of the recording zone, and a calculated slip value of the target sparing region relative to a start of the recording zone.

72. The apparatus of claim 71 wherein the address translation unit determines which, as between the calculated slip value and the slip value found in the defect description table, a target slip value is to equal, the target slip value being for the target logical block address relative to a start of the disk drive.

73. The apparatus of claim 69 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

74. The apparatus of claim 73 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

75. The apparatus of claim 74 wherein if the cylinder relative target physical head has no remainder when divided by two, the address translation unit directly determines a target physical cylinder by adding the number of the starting cylinder for the recording zone to the zone relative target physical cylinder.

76. The apparatus of claim 75 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

77. The apparatus of claim 68 wherein the physical zone table includes zone information on each said recording zone of the disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, and number of a starting cylinder for each said recording zone.

78. The apparatus of claim 77 wherein the host interface does not use recording based zone sparing, and the disk drive does not use serpentine seeking.

79. The apparatus of claim 78 wherein the address translation unit determines a target sparing region relative to a start of the recording zone, and a calculated slip value of the target sparing region relative to a start of the recording zone.

80. The apparatus of claim 79 wherein the address translation unit determines which, as between the calculated slip value and the slip value found in the defect description table, a target slip value is to equal, the target slip value being for the target logical block address relative to a start of the disk drive.

81. The apparatus of claim 77 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

82. The apparatus of claim 81 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

83. The apparatus of claim 82 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

84. The apparatus of claim 68 wherein the physical zone table includes zone information on each said recording zone of the disk media, the zone information including a starting logical block address for each said recording zone, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

85. The apparatus of claim 84 wherein the host interface does use recording based zone sparing, and the disk drive does use serpentine seeking.

86. The apparatus of claim 85 wherein the address translation unit sets a target slip value equal to the slip value found in the defect description table, the target slip value being for the target logical block address relative to a start of the disk drive.

87. The apparatus of claim 84 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

88. The apparatus of claim 87 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

89. The apparatus of claim 88 wherein if the cylinder relative target physical head has no remainder when divided by two, the address translation unit directly determines a target physical cylinder by adding the number of the starting cylinder for the recording zone to the zone relative target physical cylinder.

90. The apparatus of claim 89, wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

91. The apparatus of claim 68 wherein the physical zone table includes zone information on each said recording zone of the disk media, the zone information including a starting logical block address for each said recording zone, cumulative slip count to the beginning of each said recording zone from a starting one of said plurality of sectors of the disc drive, number of physical block addresses for each one of said tracks, and number of a starting cylinder for each said recording zone.

92. The apparatus of claim 91 wherein the host interface does use recording based zone sparing, and the disk drive does not use serpentine seeking.

93. The apparatus of claim 92 wherein the address translation unit sets a target slip value equal to the slip value found in the defect description table, the target slip value being for the target logical block address relative to a start of the disk drive.

94. The apparatus of claim 91 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording one by dividing the one relative target physical block address by the number of physical block addresses for one of said tracks, and wherein the address translation unit determines a track relative target physical block address by determining a first remainder as between the zone relative target physical block address being divided by the number of physical block addresses for one of said tracks.

95. The apparatus of claim 94 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

96. The apparatus of claim 95 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

97. A method for a disc controller, the disc controller coupled between a computer system and a disc drive, the disc drive including disk media, the disk media having at least one recording zone, the recording zone having a plurality of sectors and a plurality of tracks, the disc drive including a plurality of registers, a microprocessor, and a memory including a plurality of tables for conversion of a target logical block address into a target physical address, the target physical address being a target physical block address, the method comprising the steps of:

providing a target logical address to an address translation unit from a host interface;

determining with the address translation unit that the target logical address is a target logical cylinder-head-sector;

converting with the address translation unit the target logical cylinder-head-sector into a target logical block address;

searching by the address translation unit a first accessed one of the plurality of tables for a greatest logical block address which is not greater than the target logical block address;

determining with the address translation unit an index to a second accessed one of the plurality of tables for fetching information for converting the target logical block address into the target physical address, the first accessed one of the plurality of tables being a defect description table, and the second accessed one of the plurality of tables being a physical zone table; and converting with the address translation unit the target logical address block address into the target physical address, the defect description table including sector information on each of the plurality of sectors, the sector information including status of each one of said plurality of sectors, the recording zone associated with each of said plurality of sectors, and a logical block address for each of the plurality of sectors.

98. The method of claim 97 wherein the sector information further includes a slip value for ones of said plurality of sectors, and ones of said recording zones include at least one sparing region.

99. The method of claim 98 wherein the microprocessor loads the plurality of registers for storing information on number of heads per cylinder, defect description table base address, defect description table size, physical zone table base address, and physical zone table entry size.

100. The method of claim 99 wherein the address translation unit determines the index into the physical zone table, the index being determined from the physical zone table entry size, the recording zone associated with the greatest logical block address found, and the physical zone table base address.

101. The method of claim 100 wherein the physical zone table includes zone information on each said recording zone of the disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

102. The method of claim 101 wherein the host interface does not use recording based zone sparing, and the disk drive does use serpentine seeking.

103. The method of claim 102 wherein the address translation unit determines a target sparing region relative to a start of the recording zone, and a calculated slip value of the target sparing region relative to a start of the recording zone.

104. The method of claim 103 wherein the address translation unit determines which, as between the calculated slip value and the slip value found in the defect description table, a target slip value is to equal, the target slip value being for the target logical block address relative to a start of the disk drive.

105. The method of claims 101 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

106. The method of claim 105 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

107. The method of claim 106 wherein if the cylinder relative target physical head has no remainder when divided by two, the address translation unit directly determines a target physical cylinder by adding the number of the starting cylinder for the recording zone to the zone relative target physical cylinder.

108. The method of claim 107 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

109. The method of claim 100 wherein the physical zone table includes zone information on each said recording zone of the disk media, the zone information including a starting logical block address for each said recording zone, number of logical block addresses per said sparing region, number of slipped sectors per said sparing region, cumulative slip count to the beginning of each said recording zone from a starting one of said plurality of sectors of the disc drive, number of physical block addresses for each one of said tracks, and number of a starting cylinder for each said recording zone.

110. The method of claim 109 wherein the host interface does not use recording based zone sparing, and the disk drive does not use serpentine seeking.

111. The method of claim 110 wherein the address translation unit determines a target sparing region relative to a start of the recording zone, and a calculated slip value of the target sparing region relative to a start of the recording zone.

112. The method of claim 111 wherein the address translation unit determines which, as between the calculated slip value and the slip value found in the defect description table, a target slip value is to equal, the target slip value being for the target logical block address relative to a start of the disk drive.

113. The method of claims 109 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

114. The method of claim 113 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

115. The method of claim 114 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by adding the starting logical block address for the recording zone with the target sparing region relative to the start of the recording zone plus one quantity multiplied by the number of logical block addresses for the sparing region.

116. The method of claim 100 wherein the physical zone table includes zone information on each said recording zone of the disk media, the zone information including a starting logical block address for each said recording zone, cumulative slip count to the beginning of each said recording zone from a starting one of said plurality of sectors of the disc drive, number of physical block addresses for each one of said tracks, number of a starting cylinder for each said recording zone, and number of cylinders in each said recording zone.

117. The method of claim 116 wherein the host interface does use recording based zone sparing, and the disk drive does use serpentine seeking.

118. The method of claim 117 wherein the address translation unit sets a target slip value equal to the slip value found in the defect description table, the target slip value being for the target logical block address relative to a start of the disk drive.

119. The method of claim 116 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

120. The method of claim 119 wherein the address translation unit determines a cylinder relative target physical head by dividing the target physical track relative to the recording zone by the number of cylinders in the recording zone, and wherein the address translation unit determines a first zone relative target physical cylinder by determining a second remainder as between the target physical track relative to the recording zone being divided by the number of cylinders in the recording zone.

121. The method of claim 120 wherein if the cylinder relative target physical head has no remainder when divided by two, the address translation unit directly determines a target physical cylinder by adding the number of the starting cylinder for the recording zone to the zone relative target physical cylinder.

122. The method of claim 121 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

123. The method of claim 100 wherein the physical zone table includes zone information on each said recording zone of the disk media, the zone information including a starting logical block address for each said recording zone, cumulative slip count to the beginning of each said recording zone from a starting one of said plurality of sectors of the disc drive, number of physical block addresses for each one of said tracks, and number of a starting cylinder for each said recording zone.

124. The method of claim 123 wherein the host interface does use recording based zone sparing, and the disk drive does not use serpentine seeking.

125. The method of claim 124 wherein the address translation unit sets a target slip value equal to the slip value found in the defect description table, the target slip value being for the target logical block address relative to a start of the disk drive.

126. The method of claim 123 wherein the target physical block address is determined by the address translation unit by adding the target logical block address to a target slip value, wherein the address translation unit determines a zone starting physical block address by adding the starting logical block address for a recording zone to the cumulative slip count to the beginning of the recording zone, wherein the address translation unit determines a zone relative target physical block address by subtracting from the target physical block address the zone starting physical block address, wherein the address translation unit determines a target physical track relative to the recording zone by dividing the zone relative target physical block address by the number of physical block addresses for one of said tracks, and wherein the address translation unit determines a track relative target physical block address by determining a first remainder as between the zone relative target physical block address being divided by the number of physical block addresses for one of said tracks.

127. The method of claim 126 wherein the address translation unit determines a zone relative target physical cylinder by dividing the target physical track relative to the recording zone by the number of heads per cylinder, wherein the address translation unit determines a cylinder relative target physical head by determining a second remainder as between the target physical track relative to the recording zone being divided by the number of heads per cylinder, wherein the address translation unit determines a target physical cylinder by adding the number of the starting cylinder for the recording zone to the zone relative target physical cylinder.

128. The method of claim 127 wherein the address translation unit determines a track starting physical block address relative to the start of the disc drive by subtracting the track relative target physical block address from the target physical block address, wherein the track relative target physical block address is set equal to zero, wherein the address translation unit determines a next track starting physical block address relative to the start of the disc drive by adding the track relative starting physical block address and the number of physical block addresses for each one of said tracks, and wherein the address translation unit determines a next region starting logical block address by inference from the defect description table entry having the greatest logical block address.

129. A method for a disc controller, the disc controller coupled between a computer system and a disc drive, the disc drive including disk media, the disk media having at least one recording zone, the recording zone having a plurality of sectors and a plurality of tracks, the method comprising the steps of:

loading a plurality of registers to a microprocessor;

providing a target logical address to an address translation unit from a host interface;

determining with the address translation unit that the target logical address is a target logical cylinder-head-sector;

converting with the address translation unit the target logical cylinder-head-sector into a target logical block address;

providing a memory including a plurality of tables for conversion of the target logical block address into a target physical address;

searching by the address translation unit a first accessed one of the plurality of tables for a greatest logical block address which is not greater than the target logical block address;

determining with the address translation unit an index to a second accessed one of the plurality of tables for fetching information for converting the target logical block address into the target physical address; and converting with the address translation unit the target logical address block address into the target physical address;

the target logical cylinder-head-sector being converted into the target logical block address by the steps of:
multiplying a logical cylinder number from the target logical cylinder-head-sector by a head/drive number to provide a first quantity;

adding a logical head number from the target logical cylinder-head-sector to the first quantity to provide a second quantity;

multiplying the second quantity by a sector/track number to provide a third quantity; and adding the third quantity to a logical sector number from the target logical cylinder-head-sector minus one.

130. An apparatus for a disc controller comprising:

means for loading predefined information;

means for receiving a logical address;

means for determining a type of the logical address;

means for storing disk media information for converting the logical address into a physical address;

means for searching the disk media information to locate a greatest logical block address which is less than or equal to the logical address;

means for retrieving defect information associated with the greatest logical block address from among the disk media information;

means for determining an index into the disk media information using ones of the predefined information and the defect information;

means for retrieving zone information from the disk media information using the index;

means for converting the logical address into a physical address using the predefined information, the defect information and the zone information, said means for converting providing autonomous address translation of the logical address into the physical address;

the autonomous address translation being facilitated by a direct connection to a host interface task file, the host interface task file including data for beginning the autonomous address translation as soon as said data becomes available from a host.

131. An apparatus for a disc controller comprising:

means for loading predefined information;

means for receiving a logical address;

means for determining a type of the logical address;

means for storing disk media information for converting the logical address into a physical address;

means for searching the disk media information to locate a greatest logical block address which is less than or equal to the logical address;

means for retrieving defect information associated with the greatest logical block address from among the disk media information;

means for determining an index into the disk media information using ones of the predefined information and the defect information;

means for retrieving zone information from the disk media information using the index;

means for converting the logical address into a physical address using the predefined information, the defect information and the zone information, said means for converting providing autonomous address translation of the logical address into the physical address;

the autonomous address translation including autonomously aborting a current host command owing to receipt of a subsequent host command while the current host command is still being processed.

132. A method for a disc controller comprising the steps of:

step for loading predefined information;

step for receiving a logical address; step for determining a type of the logical address;

step for storing disk media information for converting the logical address into a physical address;

step for searching the disk media information to locate a greatest logical block address which is less than or equal to the logical address;

step for retrieving defect information associated with the greatest logical block address from among the disk media information;

step for determining an index to the disk media information using ones of the predefined information and the defect information;

step for retrieving zone information from among the disk media information using the index; and step for converting the logical address into a physical address using the predefined information, the defect information and the zone information, the step for converting providing autonomous address translation of the logical address into the physical address, the autonomous address translation being facilitated by a direct connection to a host interface task file, the host interface task file including data for beginning the autonomous address translation as soon as said data becomes available from a host.

133. A method for a disc controller comprising the steps of:

step for loading predefined information;

step for receiving a logical address;

step for determining a type of the logical address;

step for storing disk media information for converting the logical address into a physical address;

step for searching the disk media information to locate a greatest logical block address which is less than or equal to the logical address;

step for retrieving defect information associated with the greatest logical block address from among the disk media information;

step for determining an index to the disk media information using ones of the predefined information and the defect information;

step for retrieving zone information from among the disk media information using the index; and step for converting the logical address into a physical address using the predefined information, the defect information and the zone information, the step for converting providing autonomous address translation of the logical address into the physical address, the autonomous address translation including autonomously aborting a current host command owing to receipt of a subsequent host command while the current host command is still being processed.

* * * * *